(12) United States Patent
Sherman et al.

(10) Patent No.: US 11,560,111 B2
(45) Date of Patent: Jan. 24, 2023

(54) ALL TPO AIRBAG ASSEMBLIES

(71) Applicant: MCPP Innovation LLC, Tokyo (JP)

(72) Inventors: Mark Sherman, Suwanee, GA (US); Steve Cummings, White Lake, MI (US); Tim Mccollum, South Lyon, MI (US); Steve Gregory, Davisburg, MI (US)

(73) Assignee: MCPP Innovation LLC, Tokyo (JP)

( * ) Notice: Subject to any disclaimer, the term of this patent is extended or adjusted under 35 U.S.C. 154(b) by 17 days.

(21) Appl. No.: 16/833,612

(22) Filed: Mar. 29, 2020

(65) Prior Publication Data

US 2020/0307487 A1    Oct. 1, 2020

Related U.S. Application Data

(60) Provisional application No. 62/826,579, filed on Mar. 29, 2019.

(51) Int. Cl.
*B60R 21/205* (2011.01)
*B60R 21/215* (2011.01)

(52) U.S. Cl.
CPC .......... *B60R 21/205* (2013.01); *B60R 21/215* (2013.01)

(58) Field of Classification Search
None
See application file for complete search history.

(56) References Cited

U.S. PATENT DOCUMENTS

| | | |
|---|---|---|
| 6,210,797 B1 | 4/2001 | Sato et al. |
| 6,739,673 B2 | 5/2004 | Gupta et al. |
| 6,742,803 B2 | 6/2004 | Ueno et al. |
| 6,896,310 B1 | 5/2005 | Trappe et al. |
| 6,929,280 B2 | 8/2005 | Yasuda et al. |
| 7,234,724 B1 | 6/2007 | Cowelchuk et al. |
| 7,282,533 B2 | 10/2007 | Kreitschmann et al. |
| 7,527,286 B2 | 5/2009 | Beckley et al. |
| 7,637,531 B2 | 12/2009 | Paruszkiewicz, Jr. et al. |
| 7,887,087 B2 | 2/2011 | Mazzocchi et al. |
| 7,926,842 B2 | 4/2011 | Kong |
| 8,016,317 B1 * | 9/2011 | Bruyneel ............ B60R 21/2171 280/728.2 |
| 8,336,908 B1 | 12/2012 | Kalisz et al. |

(Continued)

FOREIGN PATENT DOCUMENTS

| | | | | |
|---|---|---|---|---|
| DE | 19902123 A1 * | 7/1999 | ............ | C08L 23/16 |
| DE | 10 2005 026 712 A1 | 1/2007 | | |

(Continued)

OTHER PUBLICATIONS

International Search Report and Written Opinion dated Jun. 29, 2020 in PCT/US20/25615, 13 pages.

(Continued)

*Primary Examiner* — Faye M Fleming

(74) *Attorney, Agent, or Firm* — Oblon, McClelland, Maier & Neustadt, L.L.P.

(57) ABSTRACT

An all thermoplastic olefin (TPO) airbag system for an automotive vehicle including a TPO airbag module housing coupled with a TPO airbag cover or chute, the system being particularly suitable as a front airbag system, and method of making the same. The airbag module housing may couple with the chute through a plurality of projections and windows, or through bolts.

51 Claims, 35 Drawing Sheets

(56) References Cited

U.S. PATENT DOCUMENTS

| | | | |
|---|---|---|---|
| 8,469,393 B1 | 6/2013 | Siewert et al. | |
| 8,474,861 B1 | 7/2013 | Twork | |
| 8,870,217 B2 * | 10/2014 | Kim | B60R 21/215 |
| | | | 280/728.3 |
| 9,010,800 B1 | 4/2015 | Hunter | |
| 9,033,363 B2 | 5/2015 | Witt, Jr. et al. | |
| 9,139,152 B2 | 9/2015 | Nogaret et al. | |
| 9,238,311 B2 | 1/2016 | Nebel | |
| 9,296,354 B1 | 3/2016 | Preisler et al. | |
| 9,359,498 B2 | 6/2016 | Mikami et al. | |
| 9,415,738 B2 * | 8/2016 | Mazzocchi | B60R 21/205 |
| 9,486,949 B2 | 11/2016 | Evaans et al. | |
| 9,623,591 B2 | 4/2017 | Colwell et al. | |
| 9,925,946 B2 * | 3/2018 | Webber | B60R 21/201 |
| 10,093,267 B2 | 10/2018 | Kong | |
| 10,696,266 B2 | 6/2020 | Enders et al. | |
| 2004/0160043 A1 | 8/2004 | Litjens et al. | |
| 2004/0222619 A1 | 11/2004 | Depue et al. | |
| 2004/0238114 A1 | 12/2004 | Lorenzo et al. | |
| 2005/0087963 A1 | 4/2005 | Dailey et al. | |
| 2005/0260382 A1 | 11/2005 | Schoemann et al. | |
| 2006/0290109 A1 | 12/2006 | Kielinen | |
| 2007/0145728 A1 | 6/2007 | Sadano et al. | |
| 2007/0187930 A1 | 8/2007 | Chitteti et al. | |
| 2008/0012273 A1 | 1/2008 | Cowelchuk et al. | |
| 2011/0204607 A1 * | 8/2011 | Dumbrique | B60R 21/205 |
| | | | 280/743.1 |
| 2012/0244301 A1 | 9/2012 | Radtke | |
| 2013/0001929 A1 | 1/2013 | Mazzocchi | |
| 2014/0028005 A1 | 1/2014 | Almond et al. | |
| 2014/0203540 A1 | 7/2014 | Edeline | |
| 2014/0300093 A1 | 10/2014 | Bellemakers et al. | |
| 2016/0176376 A1 | 6/2016 | Mazzocchi | |
| 2017/0036638 A1 | 2/2017 | Cowelchuk et al. | |
| 2018/0201218 A1 | 7/2018 | Zhang et al. | |
| 2018/0272983 A1 | 9/2018 | Mazzocchi et al. | |
| 2019/0016290 A1 | 1/2019 | Kim et al. | |
| 2019/0168818 A1 | 6/2019 | van Aken et al. | |
| 2019/0225179 A1 | 7/2019 | Nogaret | |
| 2020/0010042 A1 | 1/2020 | Martin | |
| 2020/0079312 A1 | 3/2020 | Stroebe et al. | |
| 2020/0148155 A1 | 5/2020 | Kwon | |
| 2020/0164826 A1 | 5/2020 | Schoonover et al. | |
| 2020/0346434 A1 | 11/2020 | Larsen | |

FOREIGN PATENT DOCUMENTS

| | | |
|---|---|---|
| JP | 2007290440 A * | 11/2007 |
| WO | WO 2018/025226 | 2/2018 |
| WO | WO 2018/172641 | 9/2018 |
| WO | WO 2019/035609 | 2/2019 |
| WO | WO 2020/006290 | 1/2020 |
| WO | WO 2020/205687 | 10/2020 |
| WO | WO 2020/223089 | 11/2020 |

OTHER PUBLICATIONS

Indian Office Action dated Feb. 25, 2022 in Indian Patent Application No. 202117043706, 6 pages.
Extended European Search Report dated Jul. 11, 2022 in European Patent Application No. 20781921.0, 10 pages.

* cited by examiner

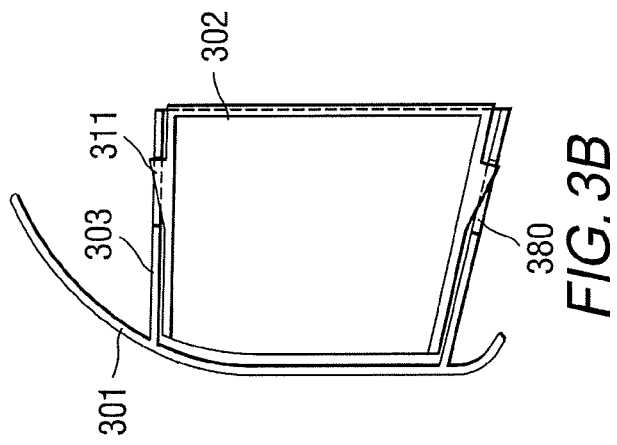
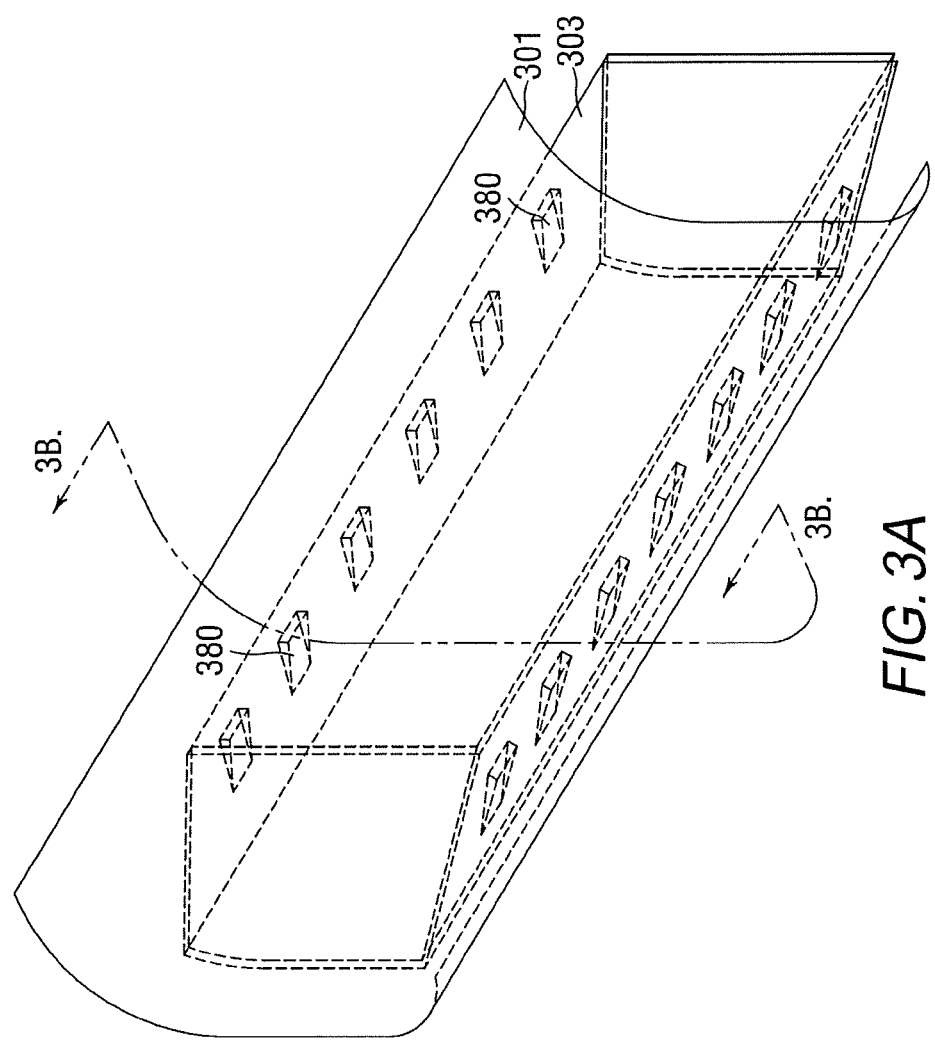

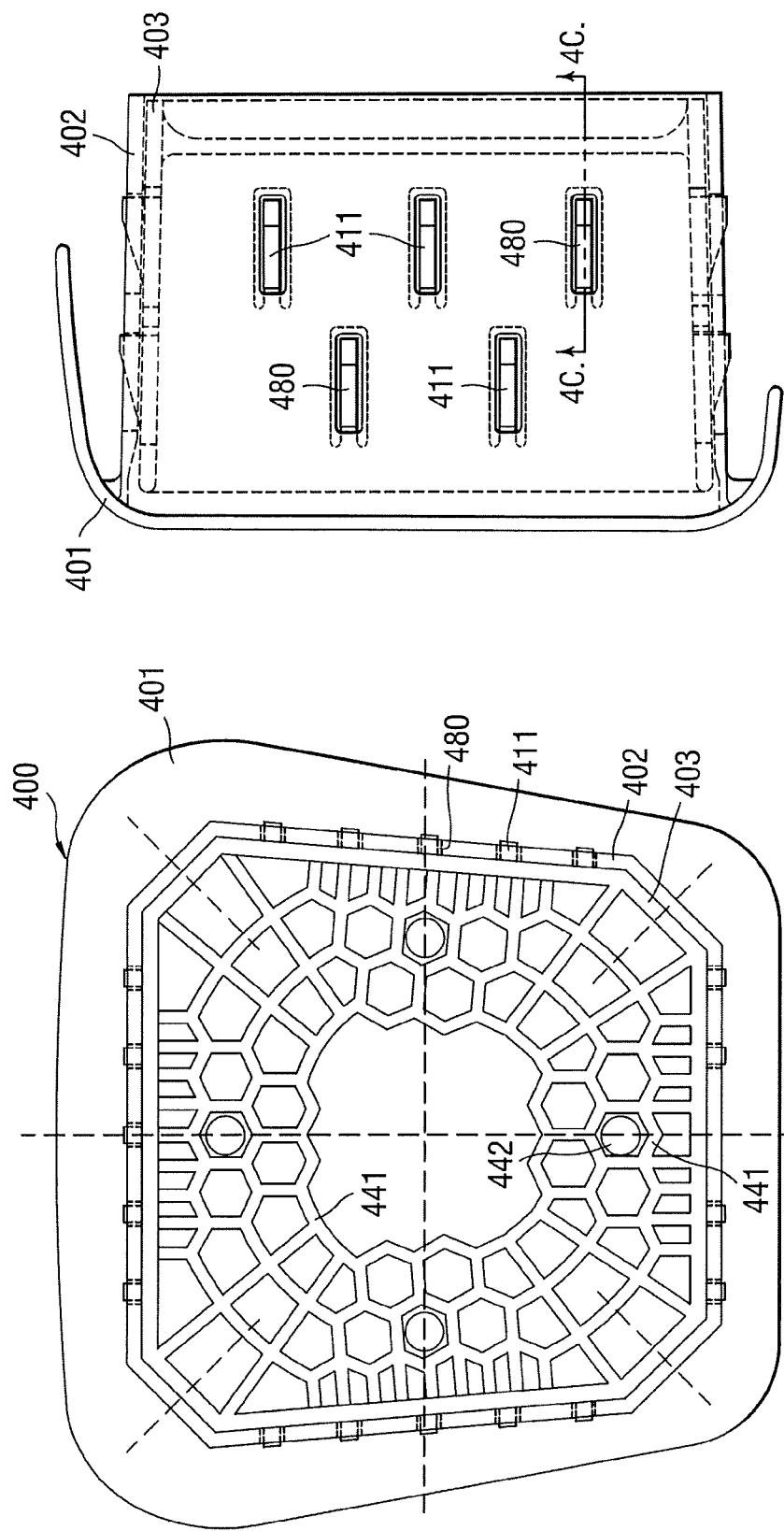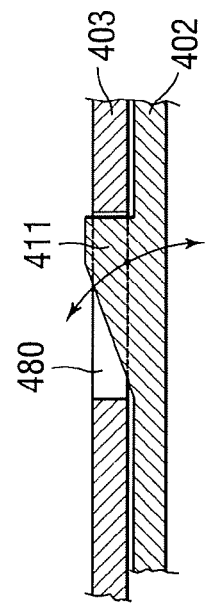

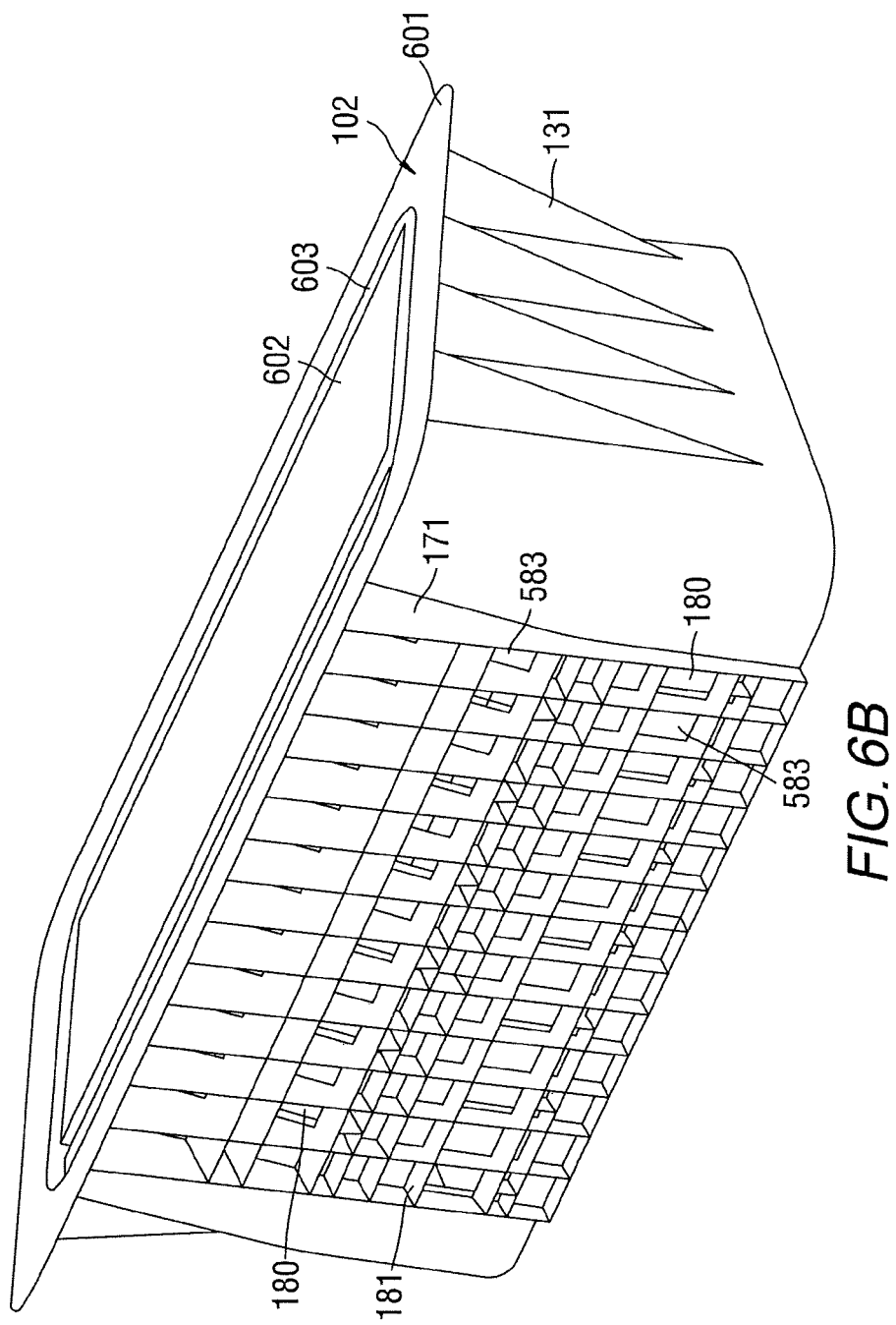

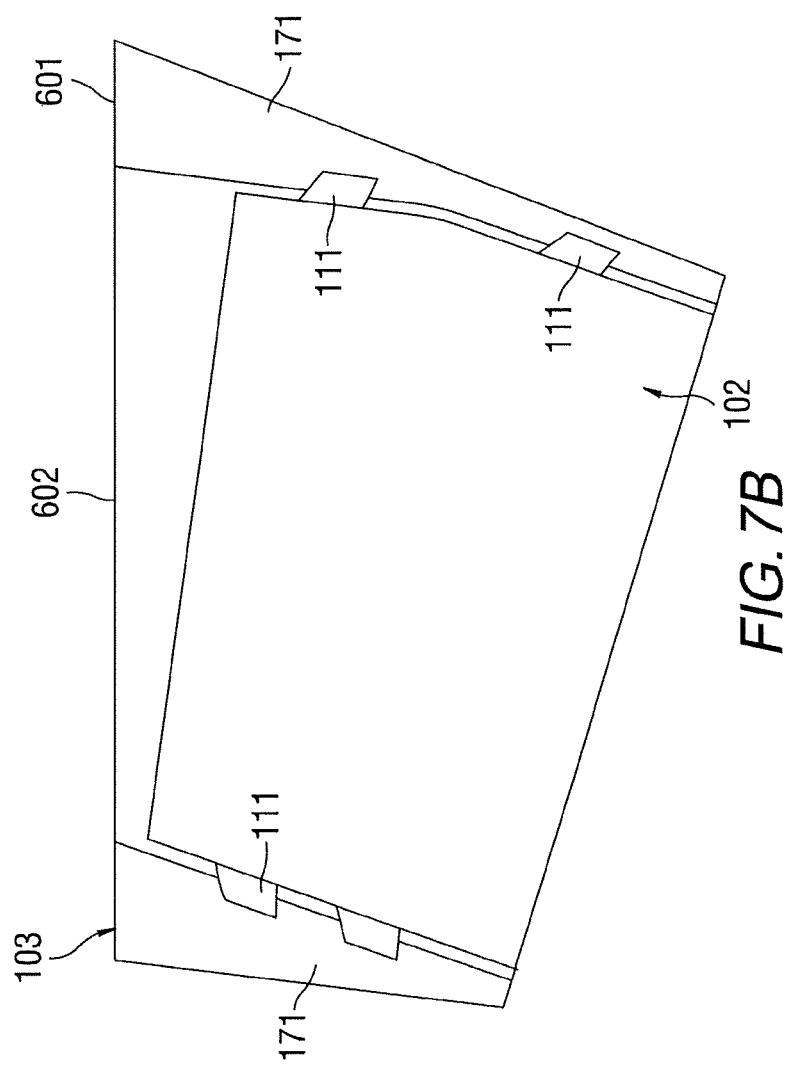

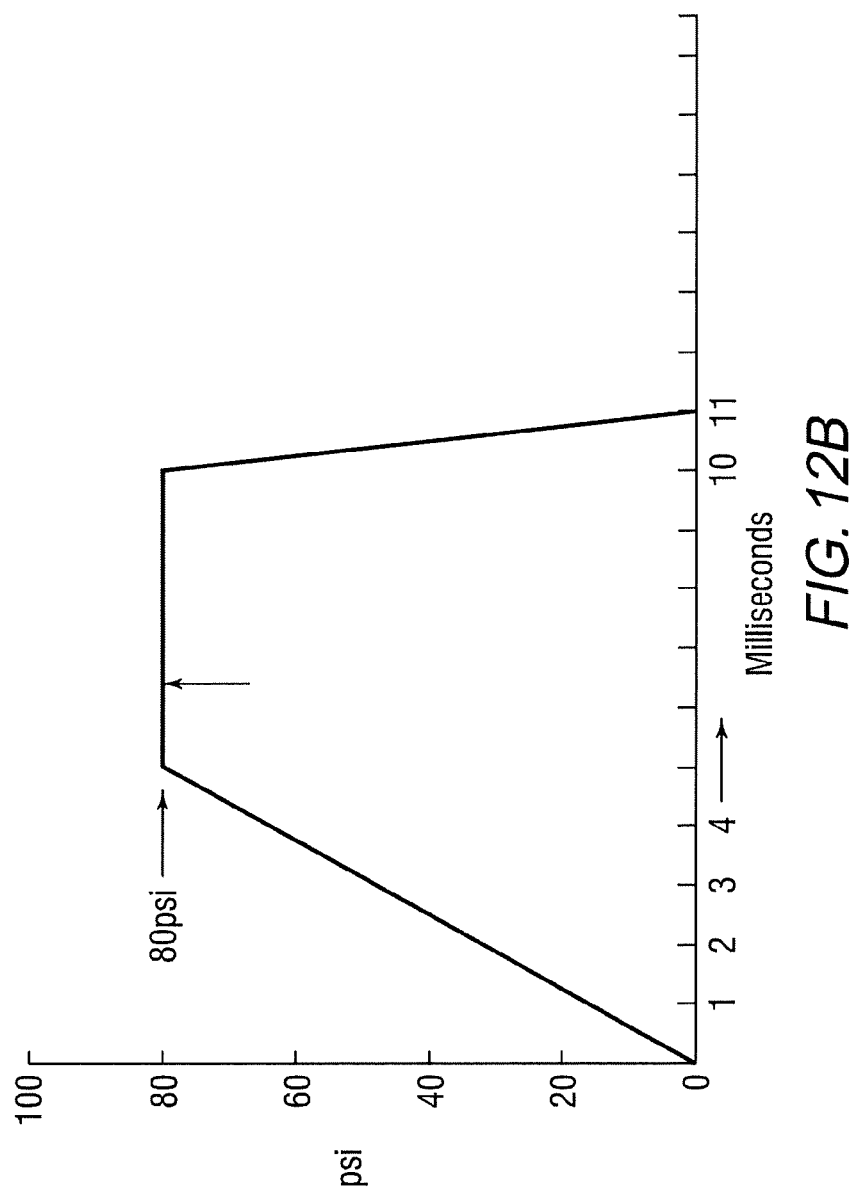

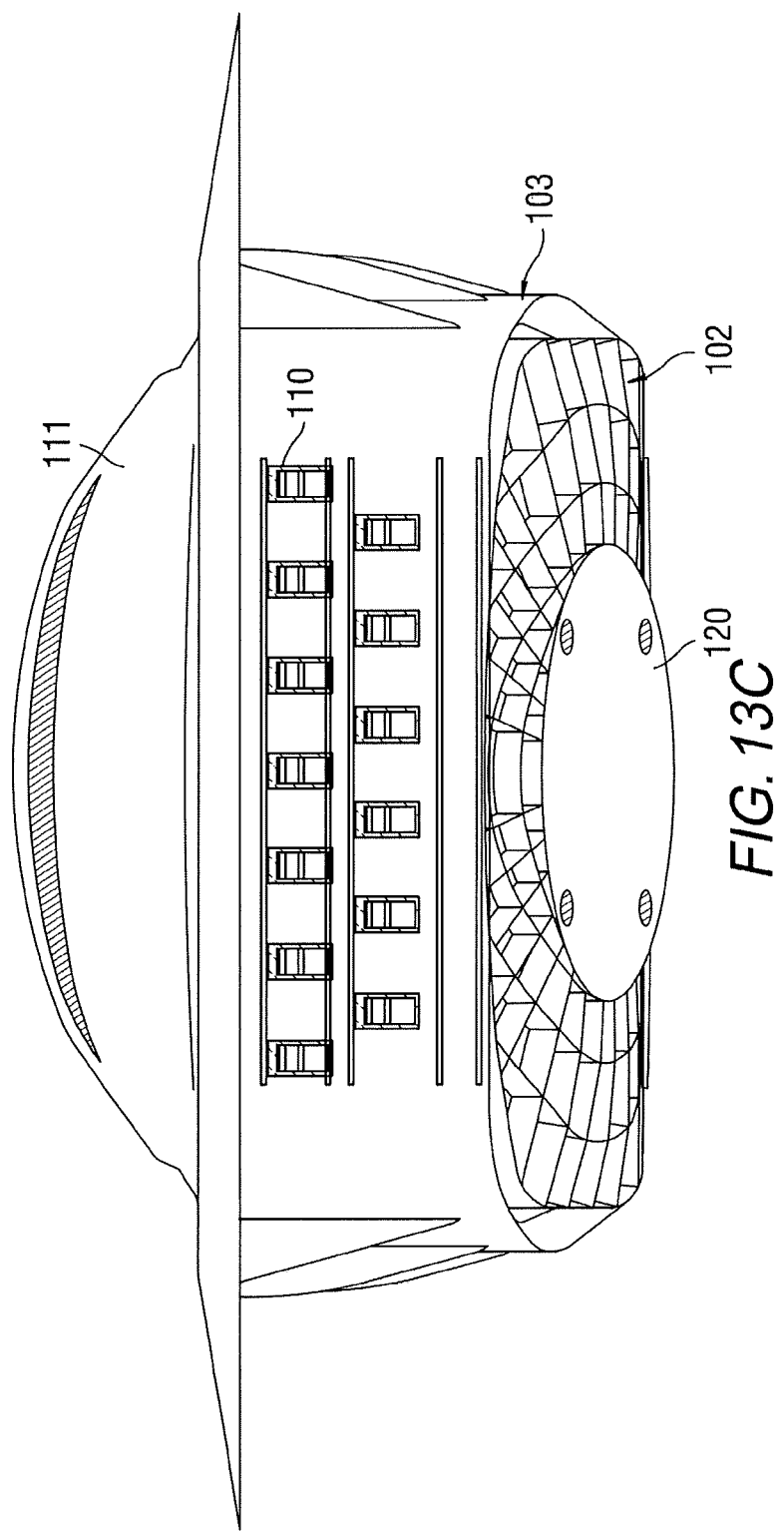

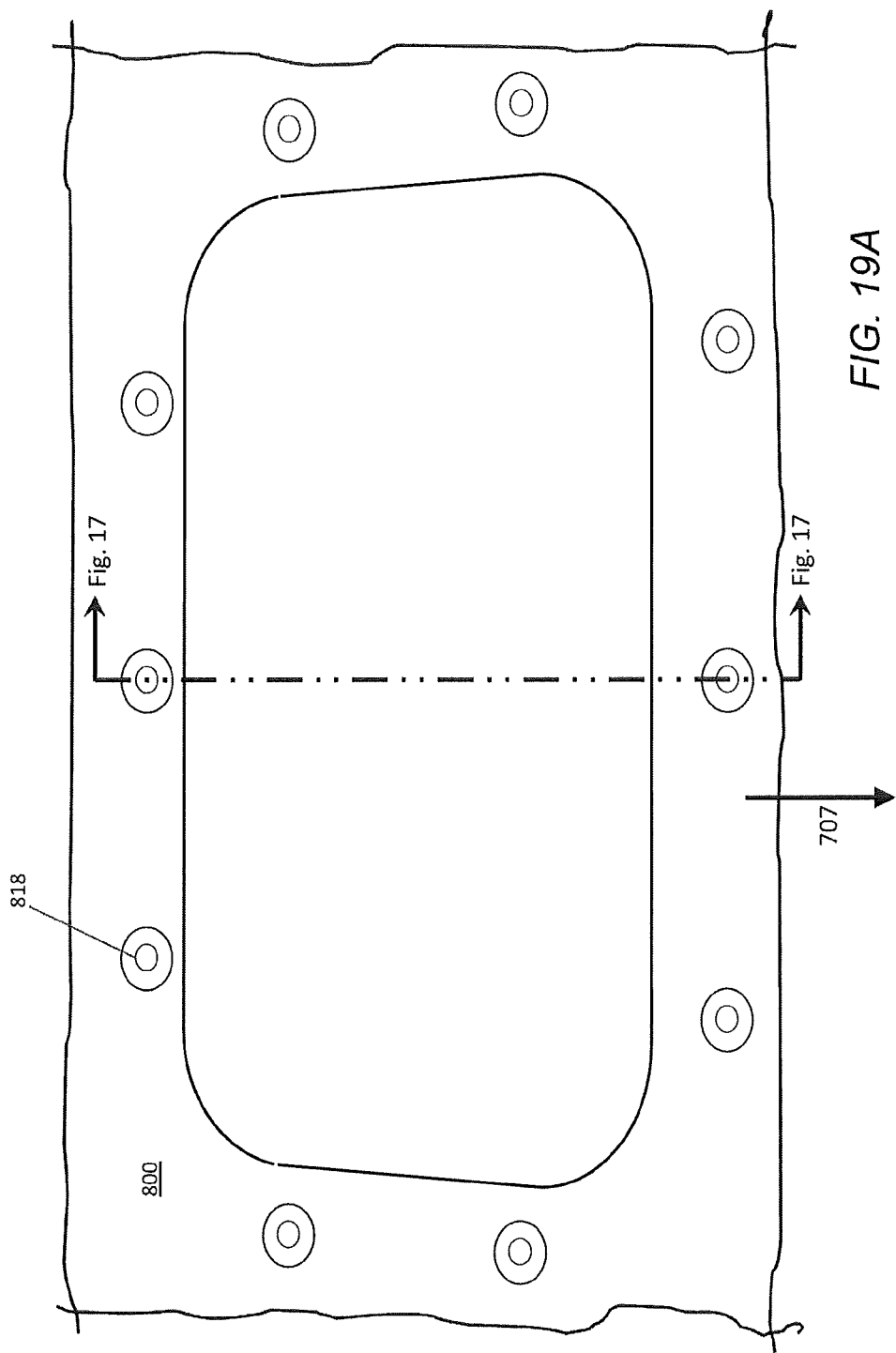

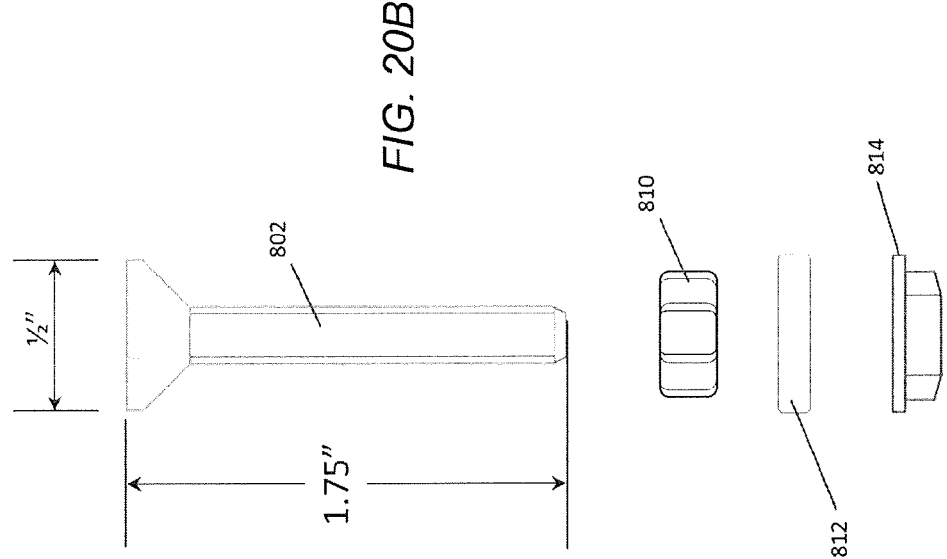
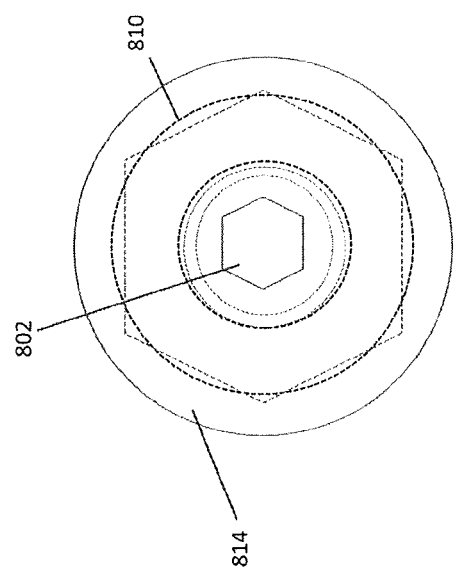
FIG. 20B
FIG. 20A

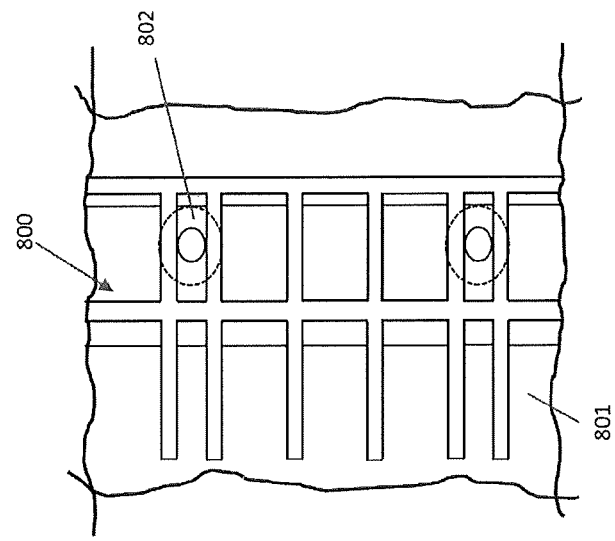
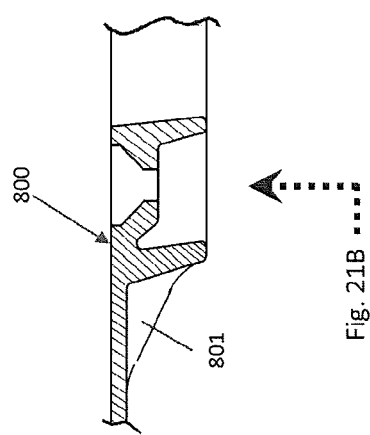
FIG. 21B
FIG. 21A

ALL TPO AIRBAG ASSEMBLIES

BACKGROUND

Field of the Invention

The inventions described herein relate to airbag modules, particularly airbag modules designed for a forward passenger compartment of an automobile where both the airbag module housing and the airbag chute are made of a thermoplastic olefin or thermoplastic elastomer, as well as methods of manufacturing such airbag modules.

Description of the Background

One of the prominent trends in automotive interiors, and especially instrument panels, is to utilize a passenger side airbag system that is seamless in appearance, meaning the breakout seams for the airbag cannot be seen by the occupants of the vehicle. These airbag systems generally employ an airbag assembly underneath the instrument panel or dashboard that is attached, often by welding, to the bottom surface of the instrument panel. The airbag system consists of several generally known parts, including an airbag chute, an airbag module housing, a folded bag and inflator (with a metal housing for the chemical reaction/propellant), and a bracket that connects the inflator housing to the car crossbeam (to react the entire load path during a deployment event, started by the occupant contacting the inflated bag in the interior).

Typical airbag assemblies can be fairly heavy and costly to produce, particularly the module housing. The module housing houses the folded bag and inflator, along with the smaller metal housing that contains the initial reactants of the propellant. This module housing is commonly made of steel or fairly dense glass-nylon (or long glass-polypropylene) composite materials in order to have sufficient mechanical strength to withstand the forces applied on the module housing during a deployment event. In contrast, the airbag chute has frequently been made of a thermoplastic olefin material to take advantage of the lighter weight of these materials and ease of fabrication by injection molding.

It is an object of the present invention to reduce the weight of known airbag assemblies by reducing or eliminating metal and glass elements from the airbag housing and replacing them with lighter weight thermoplastic materials.

It is a further object of the invention to reduce the complexity of manufacturing an airbag assembly by forming the airbag module housing and the airbag chute of the same material.

It is a further object of the present invention to provide a method of simplifying the production of an airbag module housing and chute by forming them in a single family mold.

SUMMARY

These and other objects are provided by the present invention, the first embodiment of which provides an assembly for an airbag. The assembly comprises an airbag chute configured to attach to an instrument panel and an airbag module housing attached to the airbag chute. The airbag chute and the airbag module housing each comprises at least 50 wt % thermoplastic olefin or thermoplastic elastomer.

Another aspect of the present invention relates to an airbag module housing, comprising at least 50 wt % thermoplastic olefin or thermoplastic elastomer relative to a total weight of the airbag module housing.

Another aspect of the present invention relates to an airbag chute, comprising at least 50 wt % thermoplastic olefin or thermoplastic elastomer, relative to a total weight of the airbag chute. The airbag chute comprises sidewalls and each sidewall forms a plurality of windows. Each sidewall has an exterior face, and at least two sidewalls have ribbings.

Another aspect of the present invention relates to a process for making an airbag chute and airbag module housing. This process comprises a step of simultaneously forming the airbag chute and the airbag module housing by injection molding in a family tool.

BRIEF DESCRIPTION OF THE DRAWINGS

FIG. 3A shows a representation of a perspective view of a driver or passenger knee airbag assembly according to one embodiment of the invention.

FIG. 3B shows a cross-section of the airbag assembly of FIG. 3A.

FIG. 4A shows a bottom view of a driver side frontal/upper airbag assembly.

FIG. 4B shows a side view of the driver side frontal/upper airbag assembly of FIG. 4A.

FIG. 4C shows a cross-section of a mechanical interlock of FIG. 4B.

FIG. 6B shows a top perspective view of a model of an airbag chute designed to fit together with the module housing of FIG. 6A.

FIG. 7B shows a cross section of the model of the module housing and airbag chute together assembly of FIG. 7A.

FIG. 12B shows a plot of pressure vs. time of the loading forces for deployment simulation and dynamic stress analysis on the model shown in FIG. 12A.

FIG. 13C shows a longitudinal bottom perspective snapshot of the loaded airbag system assembly of FIG. 13A at 6.5 milliseconds into the load cycle.

FIG. 19A is a top view of the instrument panel substrate showing the location of the bolt holes.

FIG. 20A is a top view of a bolt with relevant fastening pieces.

FIG. 20B is an exploded view of the bolt.

FIG. 21A is a side view of an instrument panel substrate.

FIG. 21B shows a bottom view of FIG. 21A.

DETAILED DESCRIPTION OF THE PREFERRED EMBODIMENTS

Figure 1:
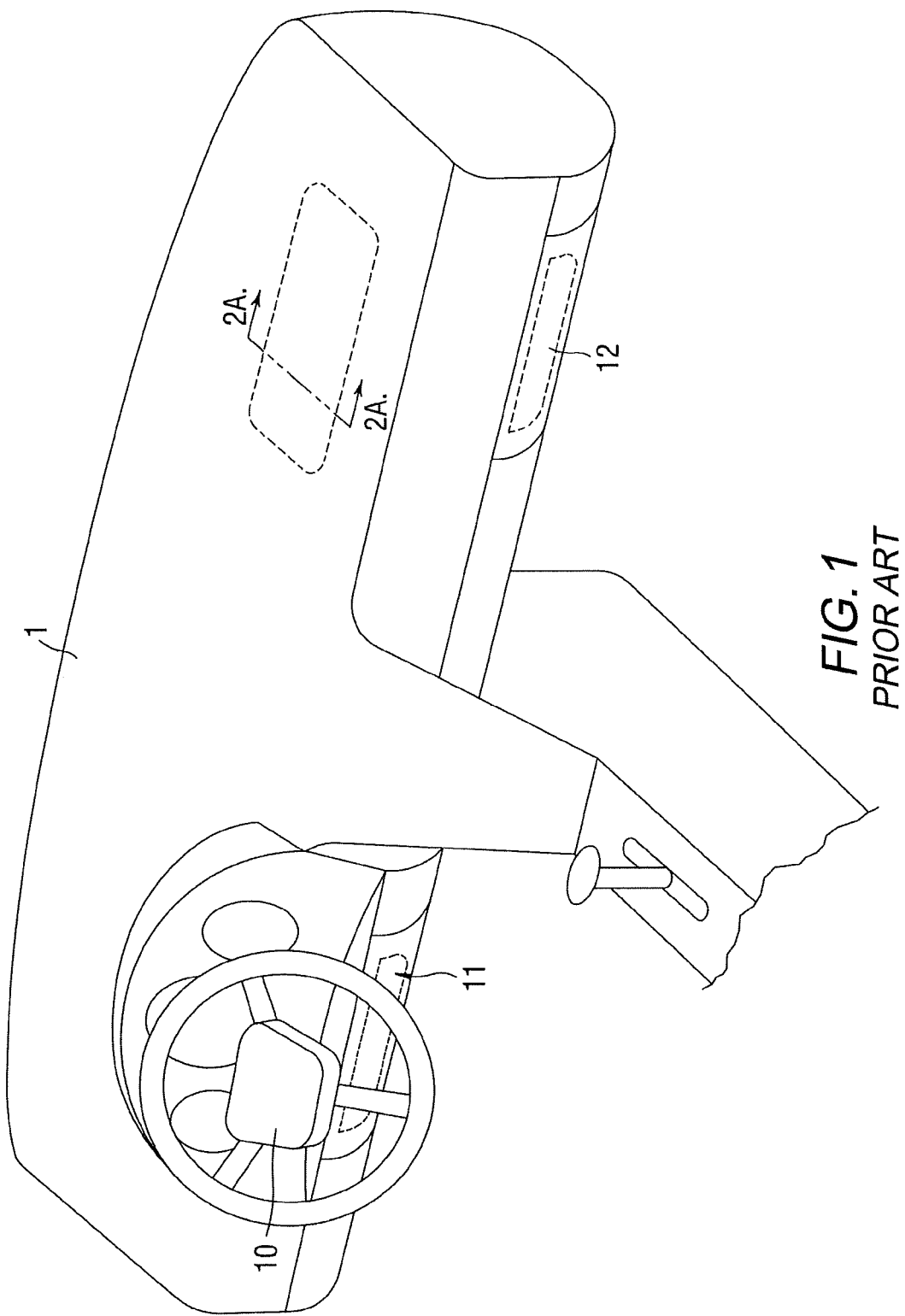
FIG. 1 shows a schematic drawing of conventional instrument panel showing frontal airbag system locations and is labelled as "Prior art."

In the following description the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference in their entirety. Where a numerical limit or range is stated, the endpoints are included. Also, all values and subranges within a numerical limit or range are specifically included as if explicitly written out.

Throughout the remainder of this description a thermoplastic olefin (TPO) material will be discussed. The phrase TPO should be understood to mean a thermoplastic elastomer that is made from polyolefins.

Polyolefins are polymers of relatively simple olefins such as ethylene, propylene, butene(s), isoprene(s), and pentene(s), and include copolymers and modifications as disclosed in Whittington's *Dictionary of Plastics*, p. 252 (Technomic Publications, 1978). An undesirable characteristic common to all polyolefins is a non-polar, non-porous inert surface which does not adhere to metal, glass, polar plastics, and other surface coating and adhesives materials without proper priming or special pretreatment.

A "thermoplastic" material is a linear or branched polymer which can be repeatedly softened and made flowable when heated and then returned to a hard state when cooled to room temperature. It generally has an elastic modulus greater than 10,000 psi in accordance with the method of ASTM D638. In addition, thermoplastics can be molded or extruded into articles of any predetermined shape when heated to the softened state.

An "elastomer" is a rubber-like polymer which can be stretched under tension to at least twice its original length and retracts rapidly to its original dimensions when the tensile force is released. An elastomer generally has an elastic modulus less than about 6,000 psi and an elongation generally greater than 200% in the uncrosslinked state at room temperature in accordance with the method of ASTM D412.

Thermoplastic elastomers (TPE) are a family of materials that have the properties of elastomers but can be processed like thermoplastics. When TPEs are made from polyolefins as described above, they are known in the industry as thermoplastic olefin elastomers (TPO). TPEs and TPOs are generally made by blending two or more polymers or by synthesizing block copolymers or graft copolymers. In each case the thermoplastic elastomer contains at least two segments, one being a rigid, usually semi-crystalline thermoplastic and the other being an amorphous elastomer.

TPOs may be made by blending together different types of polymers. These polymer blends can achieve unique properties which bridge the gap between olefinic elastomers and polyolefinic thermoplastics. For example, an ethylene-propylene copolymer elastomer or terpolymer elastomer can be blended with polypropylene. Depending on the ratio of the elastomer to the polypropylene, the properties of the blend composition can be varied from a high modulus, high hardness grade to a flexible, soft grade. Other modifications to meet specific customer needs may be made by adding other ingredients to produce useful compounds.

A first aspect of the present disclosure is to describe an airbag assembly comprising an airbag chute configured to attach to an instrument panel and an airbag module housing attached to the airbag chute. The airbag chute and the airbag module housing each comprise at least 50 wt % thermoplastic olefin (TPO) or thermoplastic elastomer (TPE), each relative to their respective total weight. Preferably the airbag chute and airbag module housing each comprise at least 60 wt %, at least 70 wt %, preferably at least 80 wt %, more preferably at least 90 wt % thermoplastic olefin or thermoplastic elastomer, each relative to their respective total weight. However, in certain embodiments, the airbag assembly may comprise less than 50 wt % TPO or TPE, such as 30-40 wt %, or 40-50 wt %. In some embodiments, the airbag assembly may be considered an "all-TPO" airbag assembly, where the chute and module housing comprise at least 95 wt %, preferably at least 98 wt %, more preferably at least 99 wt % thermoplastic olefin, each relative to their respective total weight. In some embodiments, an "all-TPO" airbag assembly may consist essentially of TPO, for instance, at least 99.9 wt %, or at least 99.99 wt %, or about 100 wt % of the chute and module housing comprises TPO.

In one embodiment, the airbag chute and/or the airbag module housing comprise a glass filler. The glass filler may be present at a weight percentage of 50 wt % or less, 40 wt % or less, 30 wt % or less, 25 wt % or less, 20 wt % or less, 15 wt % or less, 10 wt % or less, 5 wt % or less relative to a total weight of the airbag chute and/or the airbag module housing. In a further embodiment, the glass filler is glass fiber. In another embodiment, the glass filler may be present at a weight percentage of at most 5 wt %, at most 10 wt %, at most 15 wt %, at most 20 wt %, at most 25 wt %, or at most 30 wt % relative to a total weight. However, in another embodiment, the airbag chute and/or the airbag module housing may be substantially free of glass filler, meaning that the airbag chute and/or the airbag module housing comprise less than 0.5 wt %, preferably less than 0.1 wt %, more preferably less than 0.01 wt %, or about 0 wt % glass filler relative to a total weight.

A glass filler may be in the form of glass fiber, glass powder, glass flakes, milled fiber, or glass beads. The diameter of the glass fiber is not particularly limited, but a diameter of 3 to 25 is preferred. The form of the glass fiber is not particularly limited and can be suitably selected depending upon the forming method or the characteristics required for a molded product. For example, it may be a chopped strand, roving, mat, cloth, or milled fiber. The particle size of the glass powder is not particularly limited, but one having a particle size of 1 to 100 μm is preferred. The thickness and aspect ratio of the glass flakes are not particularly limited, but flakes having a thickness of from 0.1 to 10 μm and an aspect ratio of from 5 to 150, are preferred. Milled fiber may be obtained by a conventional method for producing milled fiber. For example, glass fiber strands may be pulverized by a hammer mill or ball mill to obtain milled fiber. The fiber diameter and aspect ratio of the milled fiber are not particularly limited, but a fiber diameter of 5 to 50 μm and an aspect ratio of 2 to 150 is preferred. Glass beads having a diameter of 5 to 300 μm are preferred.

In a preferred embodiment, the airbag chute and the airbag module housing are each formed of the same material, for instance, both may comprise about 85 wt % TPO, or both may comprise about 100 wt % TPO. This feature has the advantage that both chute and module housing may be formed simultaneously, for instance in one embodiment both chute and module housing are injection molded simultaneously. Further, if both chute and module housing have similar shape and size, and are made of the same material, the chute and module housing may be injection molded simultaneously in a family tool. A TPO airbag assembly has tremendous cost and weight savings relative to an airbag module housing made from steel or composite material, which materials require their own injection molding tool and process cycle. Furthermore, using the TPO disclosed herein for the airbag assembly eliminates the additional maintenance costs associated with injection molding abrasive materials, such as fiberglass reinforced resin. Additionally, the total weight of an airbag assembly made principally with TPO is estimated to be between 1 to 1.2 lbs. lower than similar airbag assemblies used today, which represents a weight reduction of about 30%. This represents a significant weight savings for an airbag assembly by today's standards, which furthermore translates to increased fuel efficiency.

In one embodiment, the TPO comprises an elastomer domain dispersed in a poly-olefinic polypropylene matrix. The elastomer domain may be any olefinic elastomer, for instance, an ethylene-propylene copolymer elastomer, a polyisoprene elastomer, or terpolymer elastomer, or any other elastomeric type domains used in TPO and TPE. In a further embodiment, the TPO comprises a thermoplastic elastomer domain dispersed in a poly-olefinic polypropylene matrix The thermoplastic elastomer domain may comprise a dispersed olefinic rubber, such as ethylene propylene rubber (EPR) or ethylene propylene diene monomer rubber (EPDM). The thermoplastic elastomer domain may be present in the TPO at a weight percentage of 5-70 wt %, preferably 10-50 wt %, more preferably 20-40 wt % relative to a total weight of the TPO. However, in some embodiments, the thermoplastic elastomer domain may be present in the TPO at a weight percentage of less than 5 wt %, such as 1-3 wt %, or 3-5 wt %, or may be present at a weight percentage of greater than 70 wt %, such as 75-85 wt %, or 85-95 wt %. The poly-olefinic polypropylene matrix may be present in the TPO at a weight percentage of 30-95 wt %, preferably 40-80 wt %, more preferably 45-70 wt % relative to a total weight of the TPO. However, in some embodiments, the poly-olefinic polypropylene matrix may be present at a weight percentage of less than 30 wt %, such as 5-15 wt %, or 15-30 wt %, or may be present at a weight percentage of greater than 95 wt %, for instance, about 97 wt %. In some embodiments, a poly-olefinic polyethylene matrix may be used in place of the poly-olefinic polypropylene matrix or may be mixed together.

In one embodiment, the TPO of the airbag assembly is a formulation such as THERMORUN TT969NU, THERMORUN TT969, THERMORUN TT1029, TEFABLOC TOSI 818, TT875NU. In one embodiment, the TPO of the airbag assembly is a formulation such as all current THERMORUN grades, including new high performance grades TT969XX, THERMORUN TT1029XX, TEFABLOC TOSI 818, and potentially any next generation developed products with equivalent or higher performance. THERMORUN/TEFABLOC Grades may be produced both locally and globally and use variations in the nomenclature as represented by the suffix "XX" to identify color and regional production. For an example, TT969XX as indicated previously MAY take in account designations including but not limited to: TT969NU (Natural, US), TT969BU (Black, US), TT969NL (Natural, Latin America), TT969BL (Black, Latin America), TT969NZ (Natural, China), TT969BZ (Black, China), etc. In a preferred embodiment, the TPO is THERMORUN TT969NU. In one embodiment, the airbag assembly may comprise an amount and type of TPO that enables the airbag assembly to be recycled with other polypropylene-based materials. The TPO of the airbag assembly may have a flexural modulus of at least 200 MPa, preferably at least 400 MPa, more preferably at least 500 MPa. The TPO may have a density of 0.70-1.05 g/cm$^3$, preferably 0.85-0.95 g/cm$^3$, more preferably 0.88-0.9 g/cm$^3$, even more preferably 0.885-0.89 g/cm$^3$. The TPO may have an elongation at break of at least 150%, preferably at least 200%, more preferably at least 300%, or at least 400%, at least 500%, at least 600%, or at least 700%. In one embodiment, the TPO of the airbag assembly exhibits strength and stiffness at elevated temperatures while retaining cold ductility and toughness.

In one embodiment, the TPO comprises the following components (A) and (B) and may comprise 10 to 300 parts by weight of the component (B) per 100 parts by weight of the component (A). Component (A) is a polypropylene-based resin, and Component (B) is an olefin-based block copolymer containing a polymer block composed of ethylene and an ethylene α-olefin copolymer block. See U.S. Pat. No. 9,359,498—incorporated herein by reference in its entirety.

Alpha-olefins (or α-olefins) are a family of organic compounds which are alkenes (also known as olefins) with a chemical formula $C_xH_{2x}$, distinguished by having a double bond at the primary or alpha (α) position. The component (A) is a polypropylene-based resin having a propylene unit content of 90 to 100 wt % and may be a propylene homopolymer or a propylene-based copolymer containing, in addition to a propylene unit, an α-olefin unit except for propylene (the "α-olefin" as used herein includes ethylene) or a monomer unit except for α-olefin, in an amount of 10 wt % or less. The α-olefin unit except for propylene includes ethylene and an α-olefin having a carbon number of 4 to 20. The α-olefin having a carbon number of 4 to 20 includes 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, 2,2,4-trimethyl-1-pentene, etc. As the α-olefin except for propylene, ethylene, and an α-olefin having a carbon number of 4 to 10 are preferred, and ethylene, 1-butene, 1-hexene, and 1-octene are more preferred.

The polypropylene-based resin of the component (A) includes, for example, a propylene homopolymer, a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer. A propylene homopolymer and a copolymer of propylene and at least one monomer selected from ethylene and an α-olefin having a carbon number of 4 to 10 are preferred. The polypropylene-based resin of the component (A) may be a polypropylene block copolymer, and among others, in view of low-temperature impact resistance and high-temperature strength, a polypropylene block copolymer obtained by polymerizing a propylene homopolymer in a first step and subsequently polymerizing a propylene-ethylene copolymer in a second step is preferred as the component (A).

The propylene unit content in the component (A) is from 90 to 100 wt %, preferably from 95 to 100 wt %, more preferably from 98 to 100 wt %, relative to the entire component (A). When the propylene unit content in the component (A) is not less than the lower limit above, the heat resistance and rigidity of the airbag housing cover are improved. Here, the propylene unit content in the component (A) can be determined by infrared spectroscopy.

The melt flow rate (measurement temperature: 230° C., measurement load: 21.18 N) of the component (A) is not limited but is usually 0.1 g/10 min or more and in view of the appearance of the molded body, 0.5 g/10 min or more, preferably 10 g/10 min or more, more preferably 20 g/10 min or more, still more preferably 30 g/10 min or more. Also, the melt flow rate (measurement temperature: 230° C., measurement load: 21.18 N) of the component (A) is usually 200 g/10 min or less and in view of tensile strength, preferably 150 g/10 min or less, more preferably 100 g/10 min or less. The melt flow rate of the component (A) is measured under the conditions of a measurement temperature of 230° C. and a measurement load of 21.18 N in conformity with ISO 1133.

As for the production method of the propylene-based resin of the component (A), a known polymerization method using a known olefin polymerization catalyst is employed. The method includes, for example, a multistage polymerization method using a Ziegler-Natta catalyst. In the multistage polymerization method, a slurry polymerization method, a solution polymerization method, a bulk polymerization method, a gas-phase polymerization method, etc. may be used, and two or more thereof may be used in combination.

In addition, as the component (A) for use in the airbag housing cover of the present invention, a pertinent commercial product may also be used. The commercially available polypropylene-based resin is procurable from the following manufacturers, etc. and may be appropriately selected. The available commercial product includes Prim Polypro® of Prime Polymer Co., Ltd., NOBLEN of Sumitomo Chemical Co., Ltd., a propylene block copolymer of Sun Allomer Ltd., NOVATEC PP of Japan Polypropylene Corporation, Moplen® of Lyondell Basell, Exxon Mobil PP of Exxon Mobil, Formolene® of Formosa Plastics, Borealis PP of Borealis, SEETEC PP of LG Chemical, ASI POLYPROPYLENE of A. Schulman, INEOS PP of INEOS Olefins & Polymers, Braskem PP of Braskem, Sumsung Total of SAMSUNG TOTAL PETROCHEMICALS, Sabic® PP of Sabic, TOTAL PETROCHEMICALS Polypropylene of TOTAL PETROCHEMICALS, YUPLENE of SK, etc.

In one embodiment, the TPO has a melt flow rate of 0.5-50 g/10 min at a measurement temperature of 230° C. and a measurement load of 21.18 N.

The component (B) constituting the thermoplastic elastomer composition for use in the present invention is an olefin-based block copolymer containing a polymer block composed of ethylene and an ethylene α-olefin copolymer block. It is preferred that the component (B) has a crystal melting peak at 110 to 125° C. and the crystal melting heat quantity at the peak is from 20 to 60 J/g. Here, in the component (B), when the crystal melting heat quantity at the crystal melting peak of 110 to 125° C. is from 20 to 60 J/g, this is an index indicating that the component (B) has a polymer block composed of crystalline ethylene. Furthermore, the component (B) has non-crystallinity based on the ethylene α-olefin copolymer block, in addition to the crystallinity based on the polymer block composed of ethylene. The component (B) has such a structure, whereby effects of high-temperature strength and low-temperature impact resistance are imparted to the airbag housing cover of the present invention. In view of high-temperature strength, the crystal melting heat quantity of the component (B) is preferably 20 J/g or more, more preferably 30 J/g or more. Also, in view of low-temperature impact resistance, the crystal melting heat quantity of the compound (B) is preferably 60 J/g or less, more preferably 50 J/g or less.

The crystalline polymer block in the component (B) is mainly composed of ethylene but may contain another monomer unit, in addition to ethylene. The other monomer unit includes, for example, 1-propylene, 1-butene, 2-methylpropylene, 1-pentene, 3-methyl-1-butene, 1-hexene, 4-methyl-1-pentene, and 1-octene. An α-olefin having a carbon-carbon double bond at a terminal carbon atom and having a carbon number of 3 to 8, such as 1-propylene, 1-butene, 1-hexene, and 1-octene, is preferred. In the component (B), only one α-olefin may be copolymerized with ethylene, or two or more α-olefins may be copolymerized with ethylene. As the component (B), only one component may be used, or two or more components may be used in combination.

The ethylene α-olefin copolymer block in the component (B) includes, for example, those having, as a constituent unit, an α-olefin such as 1-propylene, 1-butene, 2-methylpropylene, 1-pentene, 3-methyl-1-butene, 1-hexene, 4-methyl-1-pentene, and 1-octene, in addition to an ethylene unit. An α-olefin having a carbon-carbon double bond at a terminal carbon atom and having a carbon number of 4 to 8, such as 1-propylene, 1-butene, 1-hexene, and 1-octene, is preferred. In the component (B), only one α-olefin may be copolymerized with ethylene, or two or more α-olefins may be copolymerized with ethylene. As the component (B), only one component may be used, or two or more components may be used in combination.

The ethylene unit content in the component (B) is preferably from 50 to 80 wt % relative to the total amount of the ethylene unit content and the α-olefin unit content. The ethylene unit content in the component (B) is preferably large so as to prevent the component (B) from fusion due to blocking and is preferably small in view of low-temperature impact resistance when the thermoplastic elastomer of the present invention is molded. The ethylene unit content in the component (B) is more preferably 55 wt % or more, still more preferably 60 wt % or more. Also, the ethylene unit content is more preferably 75 wt % or less. Incidentally, each of the content of the ethylene unit and the content of the α-olefin unit having a carbon number of 4 to 8 in the component (B) can be determined by infrared spectroscopy.

The ethylene α-olefin copolymer in the component (B) may contain another monomer unit such as non-conjugated diene-based monomer unit (non-conjugated diene unit), in addition to the ethylene unit and the α-olefin unit having a carbon number of 4 to 8. The non-conjugated diene includes, for example, a chain non-conjugated diene such as 1,4-hexadiene, 1,6-octadiene, 2-methyl-1,5-hexadiene, 6-methyl-1,5-heptadiene, and 7-methyl-1,6-octadiene; and a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbomene. Preferred are 5-ethylidene-2-norbornene and dicyclopentadiene.

In the case where the component (B) contains another monomer unit such as non-conjugated diene unit, the content thereof is usually 10 wt % or less, preferably 5 wt % or less, relative to the entire component (B). The content of the non-conjugated diene unit or propylene unit can be determined by infrared spectroscopy.

The component (B) for use in the present invention specifically includes, for example, a block copolymer containing a crystalline ethylene polymer block and an ethylene α-olefin copolymer block such as ethylene-1-butene copolymer, ethylene-1-hexene copolymer, ethylene-1-octene copolymer, ethylene-propylene-1-butene copolymer, ethylene-propylene-1-hexene copolymer, and ethylene-propylene-1-octene copolymer. One of these block copolymers may be used, or two or more thereof may be used in combination. Among others, the component (B) is most preferably a block copolymer containing an ethylene polymer block and an ethylene-1-octene copolymer block, that is, the component (B) is most preferably an olefin-based block copolymer containing blocks of a polymer composed of ethylene and an ethylene-1-octene copolymer.

The component (B) has non-crystallinity attributable to the ethylene α-olefin copolymer block, in addition to containing a polymer block composed of ethylene having crystallinity. The non-crystallinity is expressed by the glass transition temperature, and the glass transition temperature by DSC method is preferably −80° C. or more, more preferably −75° C. or more, and is preferably −50° C. or less, more preferably −60° C. or less.

The melt flow rate (measurement temperature: 230° C., measurement load: 21.18 N) of the component (B) is not limited but is usually 10 g/10 min or less and in view of the strength, preferably 8 g/10 min or less, more preferably 5 g/10 min or less, still more preferably 3 g/10 min or less. Also, the melt flow rate of the component (B) is usually 0.01 g/10 min or more and in view of flowability, preferably 0.05 g/10 min or more, more preferably 0.10 g/10 min or more. The melt flow rate of the component (B) is measured under the conditions of a measurement temperature of 230° C. and a measurement load of 21.18 N in conformity with ISO 1133.

The density of the component (B) is, in view of low-temperature impact resistance, preferably 0.88 g/cm$^3$ or less, more preferably 0.87 g/cm$^3$ or less. On the other hand, the lower limit is not particularly limited but is usually 0.85 g/cm$^3$ or more.

As for the production method of the component (B), the polymer can be synthesized according to the methods disclosed in JP-T-2007-529617 (the term "JP-T" as used herein means a published Japanese translation of a PCT patent application), JP-T-2008-537563 and JP-T-2008-543978, each incorporated herein by reference in their entirety. For example, the polymer can be produced through a step of preparing a composition containing a mixture or reaction product obtained by combining a first olefin polymer catalyst, a second olefin polymer catalyst capable of preparing a polymer differing in the chemical or physical property from a polymer prepared by the first olefin polymerization catalyst under equivalent polymerization conditions, and a chain shuttling agent, and a step of bringing the above-described ethylene and α-olefin into contact with this composition under addition-polymerization conditions.

A continuous solution polymerization method is preferably applied to the polymerization of the component (B). In the continuous solution polymerization method, a catalyst component, a chain shuttling agent, monomers, and depending on the case, a solvent, an adjuvant, a scavenger and a polymerization aid are continuously supplied to a reaction zone, and a polymer product is continuously taken out therefrom. The length of the block can be varied by controlling the ratio and kind of the catalyst, the ratio and kind of the chain shuttling agent, the polymerization temperature, etc.

Other conditions in the synthesis method of a block copolymer are disclosed in JP-T-2007-529617, JP-T-2008-537563 and JP-T-2008-543978, each incorporated herein by reference in their entirety. The pertinent commercial product includes, for example, Engage®-XLT series and INFUSE series produced by The Dow Chemical Company. Incidentally, out of the components (B), those containing an ethylene octene copolymer block were not available as a product until the commercial production of INFUSE series and Engage®-XLT series has been started in 2007 and 2011, respectively, by The Dow Chemical Company.

In embodiments where the module housing, chute, or instrument panel comprise less than 100 wt % TPO, other additives or fillers may be mixed with the TPO before the molding or forming, including, but not limited to other polymeric or elastomeric materials, silica, perlite, talc, diatomaceous earth, calcium carbonate, zinc oxide, sodium bicarbonate, titanium dioxide, feldspar, cement, lignosulfonate, magnesium nitrate, calcium oxide, bentonite, dolomite, spinel oxide, clay, belite ($2CaO.SiO_2$), alite ($3CaO.SiO_2$), celite ($3CaO.Al_2O_3$), or brownmillerite ($4CaO.Al_2O_3.Fe_2O_3$), mica, other carbonates, other ceramic fillers, carbon black, fibers, fiberglass, metal hydrates, other oxides, reinforcers, antioxidants, UV stabilizers, release agents, processing aids, nucleating agents, and pigments. In one embodiment, the airbag chute and/or the airbag module housing further comprise a TPE that is not a TPO. In one embodiment, the airbag chute and/or the airbag module housing further comprise an insert molded fabric or scrim. The scrim may comprise cotton, linen, glass fiber, carbon fiber, or some other fiber.

As mentioned previously, the airbag module housing and airbag chute may be prepared by a variety of processes. The module housing and chute may be injection molded, blow molded, compression molded, low pressure injection molded, extruded and then thermoformed by either male or female vacuum thermoforming, injection compression-molding, injection-foaming, injection hollow molding, compression-molding or prepared by a hybrid process such as low pressure molding wherein a blanket of still-molten TPO material is placed against the back of a skin foam composite and pressed under low pressure to form the skin and bond it to a hard TPO substrate. For injection molding, the molding temperature may be in the range of about 100 to about 300° C., preferably about 150 to about 280° C.; the injection pressure is in the range of usually about 5 to about 150 MPa, preferably about 7 to about 100 MPa, preferably about 10 to about 80 MPa; and the mold temperature is in the range of usually about 20 to about 80° C., preferably about 20 to about 60° C. In other embodiments, the airbag module housing or chute may be formed by other manufacturing methods, such as casting, forming, machining, or joining of two or more pieces.

In one embodiment, following the injection molding or forming of the module housing and/or chute, a surface treatment method may be applied, including but not limited to, priming, solvent etching, sulfuric or chromic acid etching, sodium treatment, ozone treatment, flame treatment, UV irradiation, and plasma treatment.

It is also envisioned that the TPO airbag assembly may be adapted for other applications that combine modular housings and explosive or propellant reactants. For instance, the TPO airbag assembly may be modified for containing an inflatable raft, slide, or other flotation device, or may be adapted to expel to an outside of a vehicle to limit the impact of exterior collisions. In another embodiment, the TPO airbag assembly may be modified to hold a dispersible substance, including but not limited to fireworks, confetti, fire suppression agents, or substances for special effects such as fake snow.

FIG. 1 shows a known instrument panel 1 in the front of an automobile. As is known, the front passenger section of the automobile panel 1 may have at least four airbags including a driver front airbag 10 at the center of the steering wheel, a driver knee airbag 11, a passenger front airbag 12, and a passenger knee airbag 13. In addition, some automobiles may have a pedestrian system airbag. Known airbag assemblies in any or all of these locations may be replaced with airbag assemblies according to the present invention.

Figure 2A:
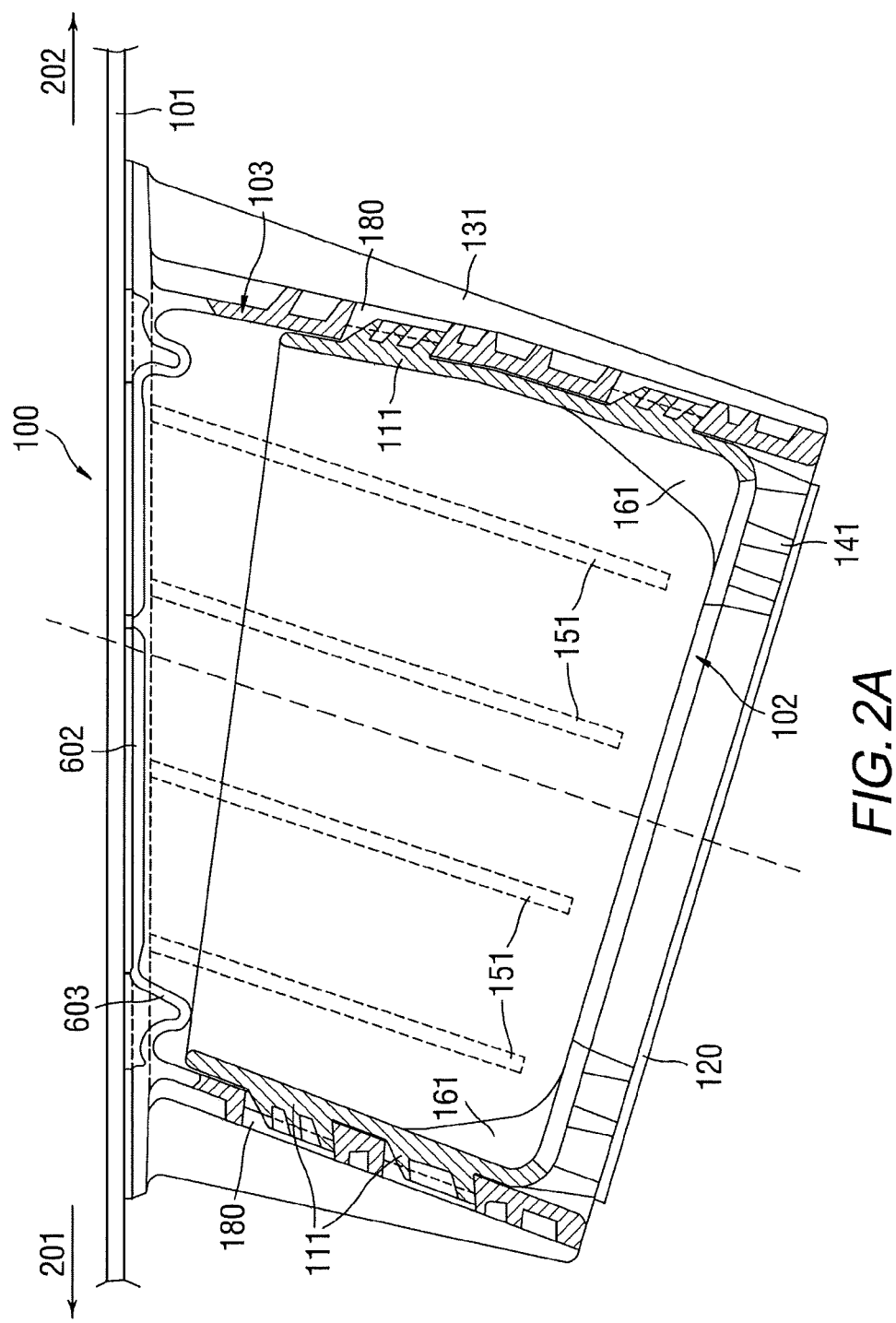
FIG. 2A shows a cross-car section view of a passenger side frontal/upper airbag assembly and instrument panel illustrating one embodiment of the invention.

The passenger side airbag system and instrument panel assembly 100 shown by the cross-section view of FIG. 2A represents one embodiment of the present invention. For reference, arrow 201 represents the car forward direction and arrow 202 represents the car rearward direction. In this example, both a TPO module housing 102 and TPO airbag chute 103 are employed. These two parts, one inserted within the other, combined with a PP (polypropylene) based hard top layer 101 or hard PP based substrate (for soft instrument panel, either wrapped or foamed) represents an "all TPO airbag system," or "all TPO airbag assembly" for seamless hard and soft instrument panels. The hard top instrument panel 101 may be made of a 20% talc filled TPO hard resin, for example. The top end of the airbag chute 103 may be connected to the instrument panel layer 101 by various manufacturing methods including but not limited to; vibration welding, sonic welding, infrared welding, top-load type design, snap-fit or snap-in type design, adhesive bonding, mechanical fastening such as bolt on, clips, or any other current method used to attach the airbag chute to the instrument panel. In some embodiments, the instrument panel layer or instrument panel substrate may comprise glass-filled PP or other glass filled variations where the glass may be glass fibers, talc filled PP, unfilled PP, or other amorphous resin substrate types. In one embodiment, the instrument panel layer or instrument panel substrate does not contain glass and/or does not contain talc.

Figure 17:
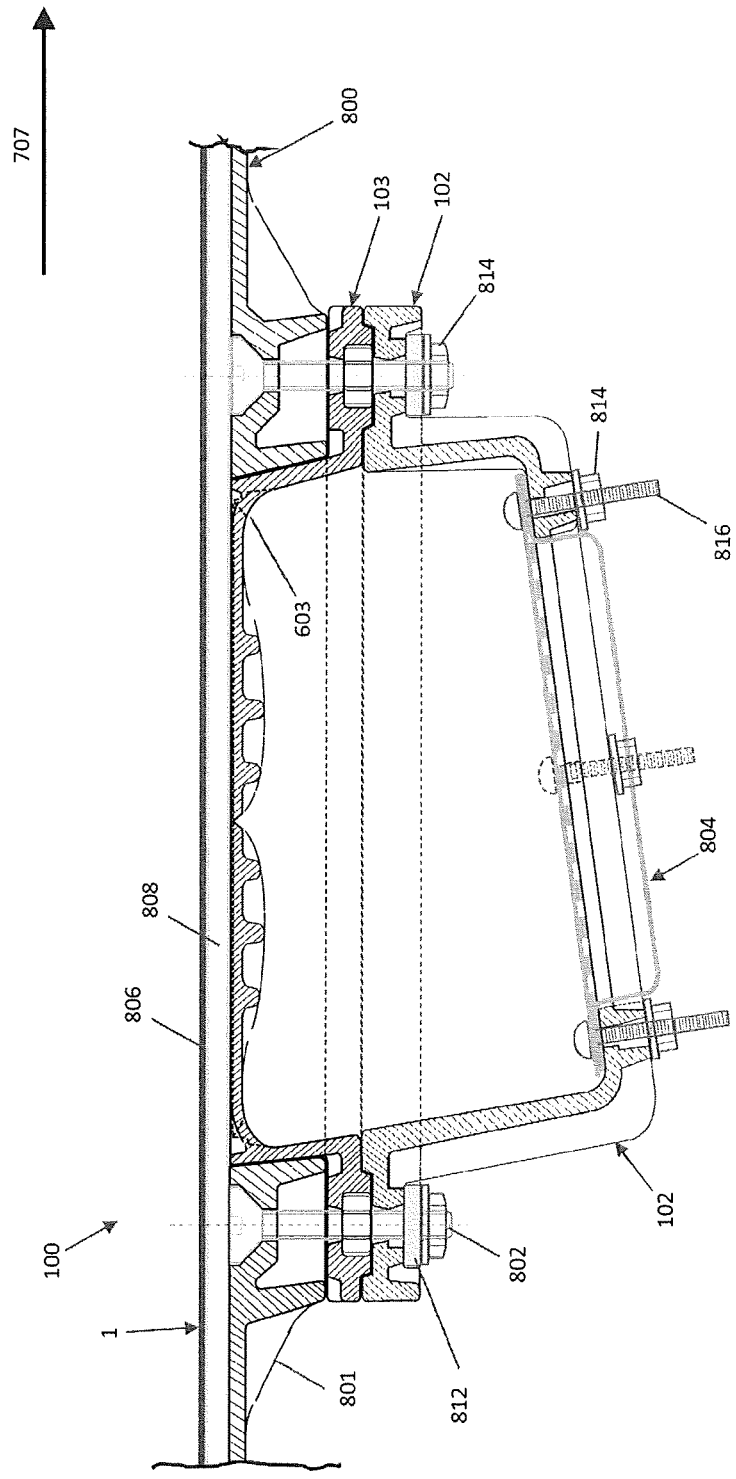
FIG. 17 is a cross-section view of a bolted on passenger airbag assembly.
Figure 18:
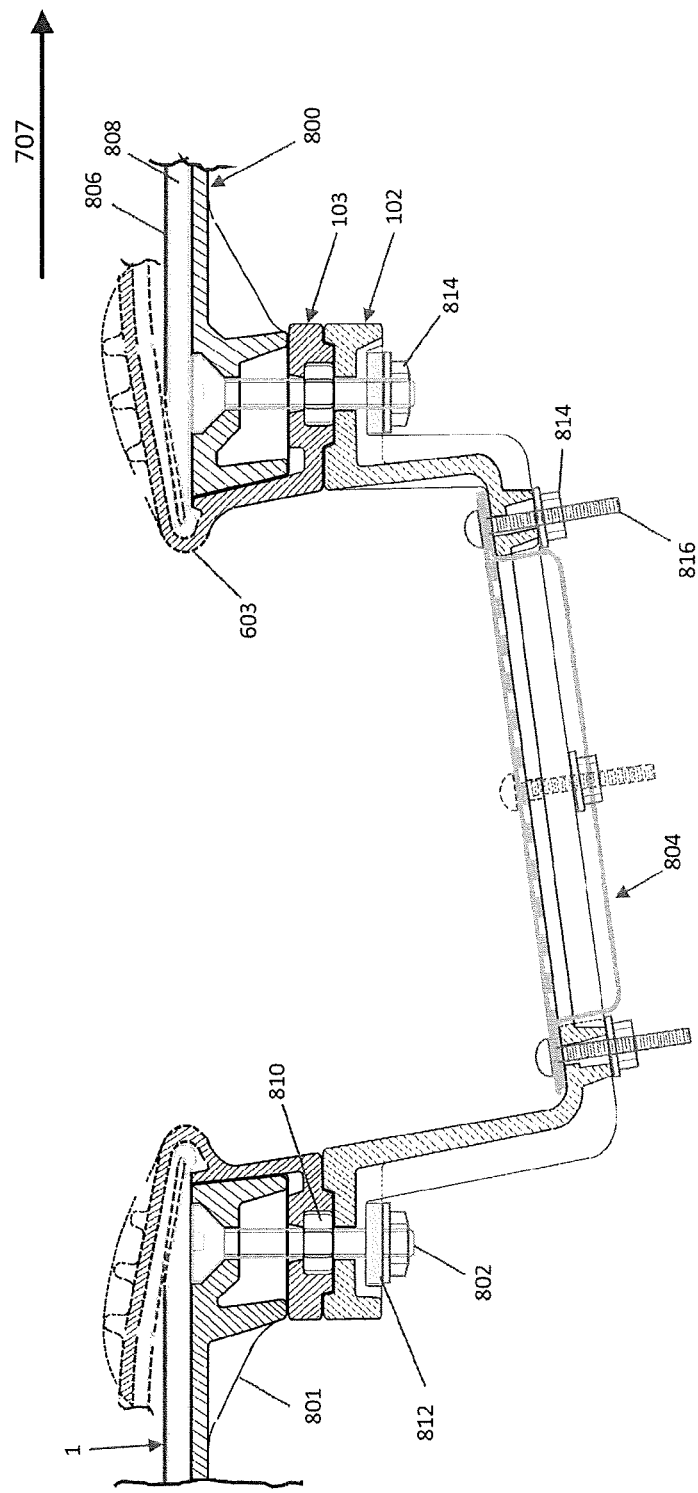
FIG. 18 is the airbag assembly of FIG. 17 in an opened state.

In one embodiment, an instrument panel substrate comprising glass-PP may attach between an instrument panel and an airbag chute. Here, the instrument panel may comprise a soft material, such as a skin and a foam. Additional support to the instrument panel directly above the airbag housing may be provided by doors of the chute. One such embodiment of the instrument panel substrate and soft instrument panel is shown in FIGS. 17 and 18.

Current airbag systems used for seamless instrument panels all employ either a metal or composite (glass-nylon or long glass fiber-reinforced-polyolefin) airbag module housing due to the need for hooks with high local strength and stiffness, and subsequent engagement with the open windows on the TPO chute. A unique feature of this invention is the TPO module housing 102 with many more mechanical interlocks 110 of windows and projections designed to disperse the load/stress while maintaining engagement via utilization of the internal pressure of a deployment, and throughout the deployment of the bag (not shown) through the instrument panel 1.

In the FIG. 2A example, the long walls of the airbag chute may have a plurality (such as 4, 6, or 8) of deeper gussets 131, spaced apart from one another by a distance such as ⅜", ½", or ⅝" spacing, in a central region on the long walls of the chute 103. The end walls of the chute 103 may also have a plurality (such as 4, 6, or 8) of gussets 151 extending from the outside of the end walls. The chute 103 may also include a plurality (such as 4, 6, or 8) of vertical ribs 171 (shallow gussets) on the long wall. The long walls may also include a plurality of internal housing gussets 161 (such as 4, 6, or 8) on each long wall. In the example in FIG. 2A, the central two internal housing gussets 161 on the chute's long wall are closer together (e.g., ½" spacing) than the remaining gussets on each side of the center (e.g., 1" spacing).

Still in the FIG. 2A example, the bottom of the airbag module housing 102 preferably includes a plurality of ribs 141. The ribs may have a depth such as 4-10 mm, 5-9 mm, or about 8 mm. Underneath the ribs 141 in the simulations described further herein is a metal plate 120 which simulates a pancake inflator enclosed in the airbag module housing. This metal plate 120 may be secured using bolts or screws that traverse the bottom of the airbag module housing through dedicated holes 442.

As can also be seen in the FIG. 2A example, the two long walls of the chute 103 have different heights, with the height of the wall nearest the car forward direction 201 being shorter than the height of the long chute wall car rearward direction 202. This difference in heights creates an angle between the plane of the instrument panel and the plane of the bottom of the airbag chute (or bottom of the airbag module housing), which angle may be 5°-30°, preferably 10°-28°, more preferably 15°-25°, or about 18°. A similar height difference may be found between the two long walls of the airbag module housing, but as shown in FIG. 2A, the top of the airbag module housing forms an angled gap with the top of the airbag chute. In other words, a plane containing the top of the airbag module housing and a plane containing the top of the airbag chute intersect at an angle of 1°-15°, preferably 3°-10°, more preferably 5°-8°, or about 7°. As can be further seen in the FIG. 2A example, the heights of the long walls and end walls of the airbag module housing 102 are lower than the heights of the long walls and end walls of the chute 103.

As evident from FIG. 2A, the airbag module housing 102 is completely contained within the airbag chute 103 when the two are connected as an airbag assembly. In other words, the airbag module housing is completely inserted into the airbag chute. Thus, 100% of the airbag module housing sidewall area forms a double wall, or overlaps with interior walls of the airbag chute. This structural feature may increase the strength of the all-TPO airbag assembly during airbag deployment, and also the hoop tension of the airbag module housing to completely couple with the hoop tension of the airbag chute. In one embodiment, the airbag module housing sidewall forming a double wall enables the sidewall thickness to be reduced. In alternative designs, an airbag module housing may not need to insert completely into a chute for increased strength if one or more sidewalls have an increased thickness. In other designs one or more hoop tension rings may be placed around the airbag module housing or airbag chute for increased strength during airbag deployment. Alternatively, one or more hoop tension rings may be placed within the airbag module housing or airbag chute during the molding or forming process. In one embodiment, the one or more hoop tension rings may comprise a metal, such as aluminum.

Also evident from the FIG. 2A is that less than 100% of the total area of the airbag chute interior walls may form a double wall with the sidewalls of the airbag module housing. For instance, 60-98%, preferably 70-97%, more preferably 75-95%, even more preferably 80-90% of the total area of the airbag chute interior walls form a double wall with the sidewall. Thus, 90-100% of the airbag module housing sidewall area forms a double wall with the sidewall.

Figure 2B:
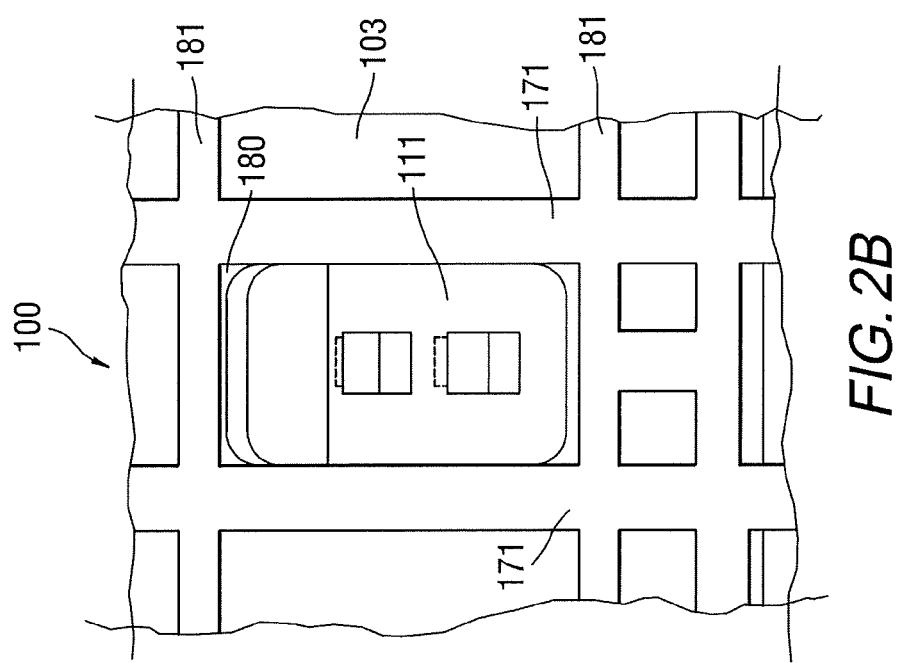
FIG. 2B shows a plan view of a mechanical interlock from FIG. 2A.

FIG. 2B shows a plan view of an interlock mechanism 110 of the assembly which includes a window 180 defined by vertical ribs 171 and horizontal ribs 181 of the chute 103. The window 180 receives a projection 111 of a substantially matching shape which together forms the interlock mechanism 110. In other embodiments, an interlock mechanism may be considered a snap fit.

FIGS. 3A and 3B show an example of an embodiment of a driver or passenger airbag assembly in accordance with the invention. In this example, the long walls of the airbag chute 303 contain a single row of windows 380 and the long walls of the module housing 302 contain a plurality of projections 311 to match the number of windows 380. The panel 301 facing the passenger compartment forms a knee airbag cover and is attached to the top of airbag chute 303. Other embodiments relating to FIGS. 3A and 3B may include gussets and/or ribbing structures similar to those described in FIGS. 2A and 2B. It is also envisioned that the projections 311 and windows 380 are arranged in two or more rows, or may be arranged in staggered positions.

FIGS. 4A-4C shows an example of an embodiment of a driver's side upper airbag assembly 400 that is typically found at the center of a steering wheel. FIG. 4A shows a plan view of the assembly, which includes a plurality of ribs 441 on the side of the airbag module housing 403 facing away from the driver. FIG. 4B shows a side view of the assembly, where the airbag chute 402 has a staggered arrangement of windows 480 which form mechanical interlocks with the projections 411 of the airbag module housing. A steering wheel cover 401 forms a side of the airbag assembly facing the driver. A side view of a single mechanical interlock in this assembly is shown in FIG. 4C, with the arrows indicating the movement of the projection when the module housing is inserted and pressed into the chute. As evident from FIGS. 4A and 4B, each of the four sides of the module housing has five projections that interlock with the same number of windows in each of the four sides of the chute. In related embodiments, fewer or more mechanical interlocks may be used, or the mechanical interlocks may be arranged linearly or in another pattern, rather than staggered into two rows. In other embodiments, a driver's side upper airbag assembly may include a plurality of shallow gussets, deep gussets, internal gussets, and/or ribs on the sides of the chute, similar to what was described in FIG. 2A. It is equally envisioned that a TPO airbag assembly may be adapted to any airbag location within a car or vehicle, such as knee airbags, driver and front passenger airbags, roof rail airbags, curtain airbags, front-row side impact airbags, second-row side airbags, rear-center airbags, seat cushion airbags, twin chamber airbags, an external airbag, a pedestrian airbag, or some other location. It is also envisioned that other cabins or capsules that are not typically understood as vehicles may be fashioned with the TPO airbag assembly, including but not limited to gondolas, Ferris wheels, airplanes, trains, boats, and space capsules.

Figure 5B:
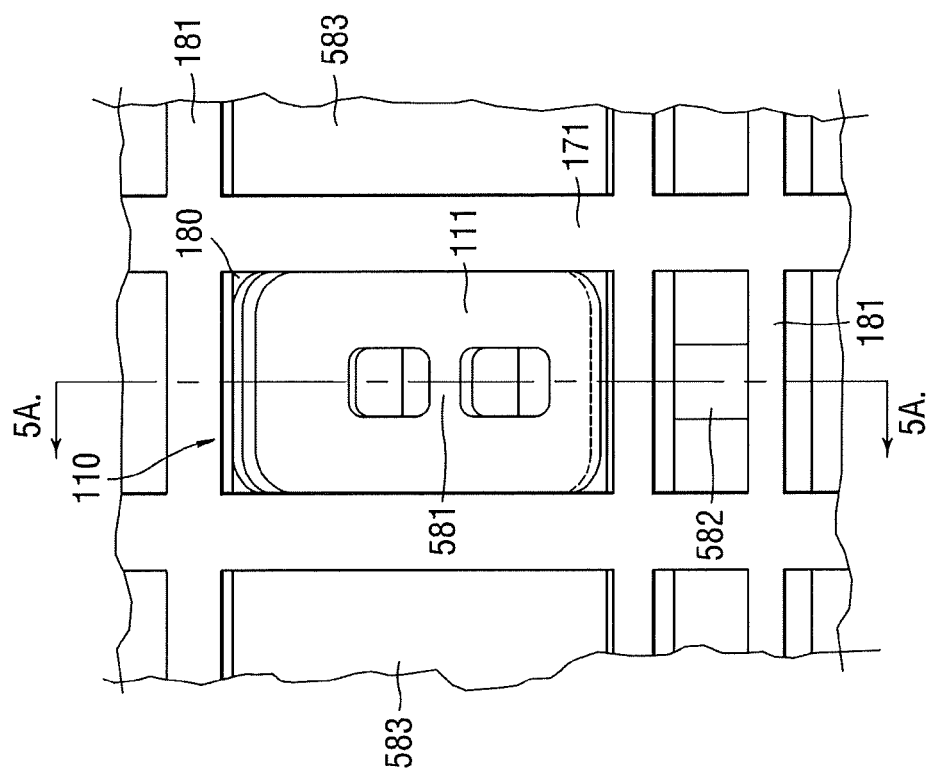
FIG. 5B shows a cross section of the structure in FIG. 5A.
Figure 5A:
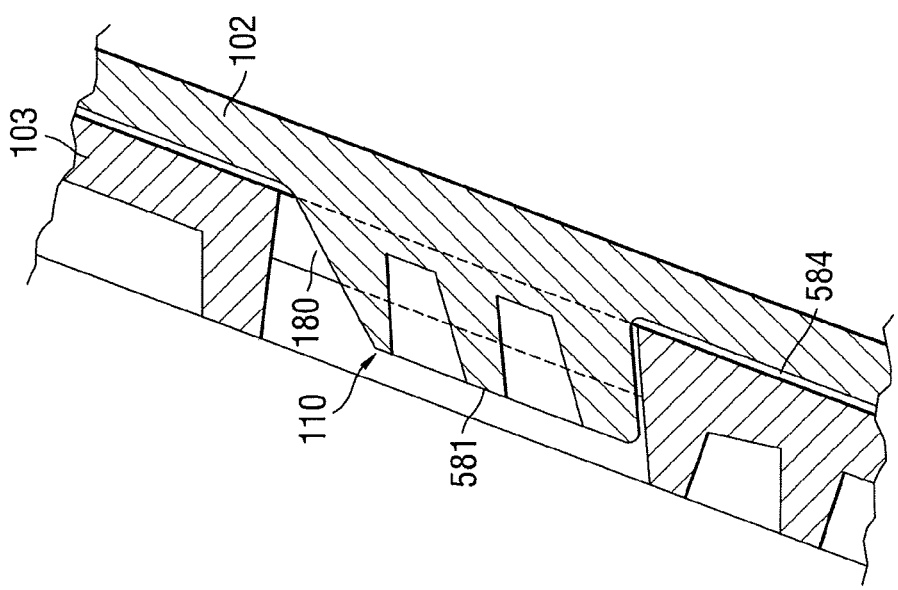
FIG. 5A shows a mechanical interlock/fastener/hook on a TPO module housing wall used to interlock the module housing to the airbag chute, as well as ribbing structure around windows of the chute wall, according to one embodiment of the invention.
Figure 15A:
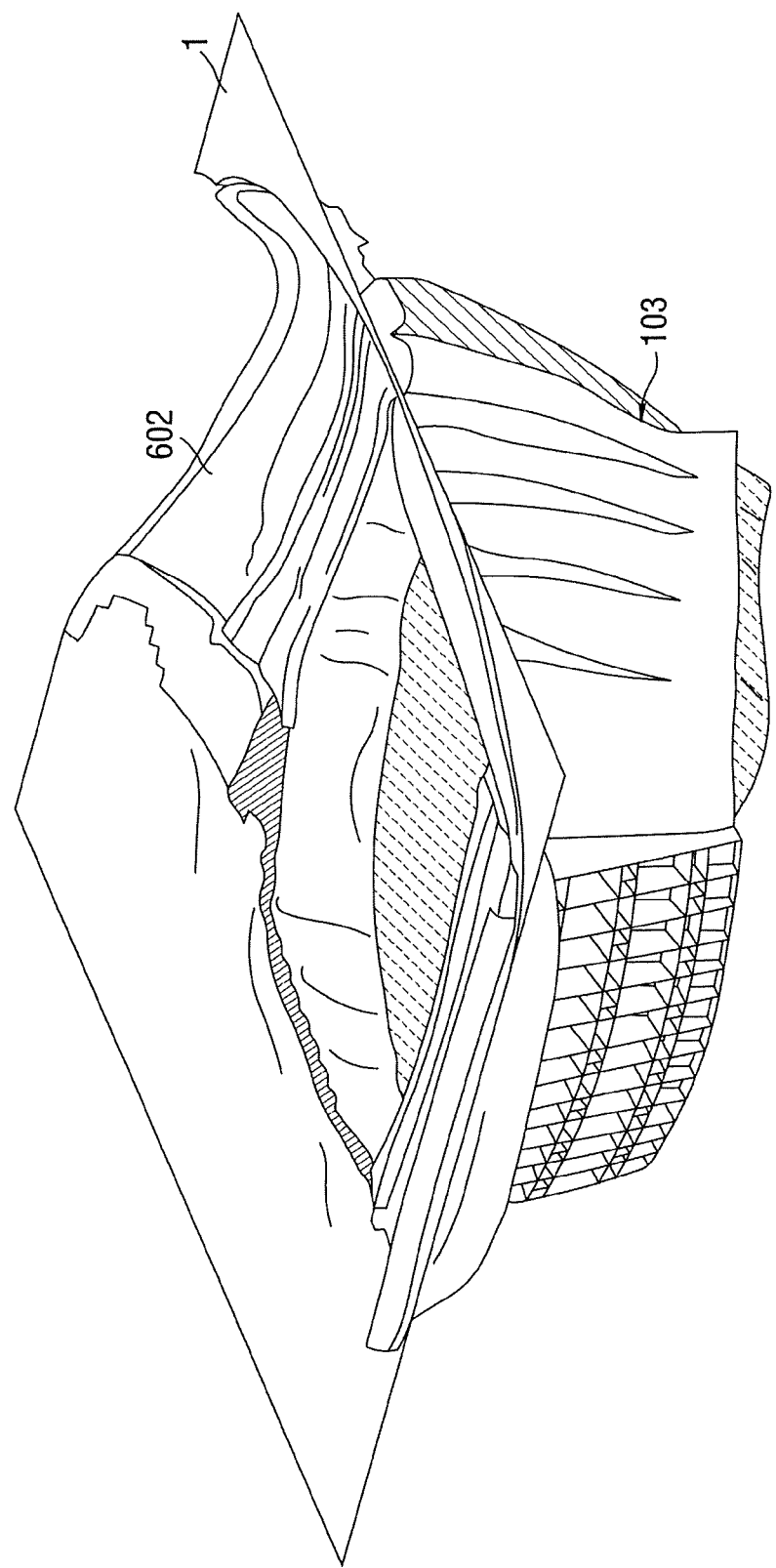
FIG. 15A shows a perspective view the airbag assembly of FIGS. 13A-C and 14A-C after being subjected to the load cycle.

FIGS. 5A and 5B provide detailed views of one embodiment of the mechanical interlocking feature 110, which may be used in the passenger side airbag assembly as shown in FIG. 2A. This interlocking feature 110 is integrally molded as part of the module housing 102, and once assembled with the chute 103, is reinforced by the integrally molded ribbing 171, 181 around the open windows 180 on the walls of the airbag chute. The compliance and lower modulus of both parts, due to being molded with the preferred TPO as described herein, enables the walls of the chute and module housing to deform and bend during airbag deployment, thus allowing the projections of the mechanical interlocks to press against the sides of the windows in the long walls of the TPO chute. This mechanical interlocking, and large interlocking area created by 26 total interlocking locations, 13 per long side, results in dispersing the load and reducing stresses to that safely absorbed by the airbag TPO. In one preferred embodiment, the interlocking elements and windows are made of TPO. In other words, this mechanical interlock feature is capable of replacing stronger hooks in other materials such as steel or composites (glass-nylon or long glass-PP). This ability is due to the number of interlocking elements, and the way in which the load is spread out, which reduces localized stresses. This design concept utilizes the internal pressure of bag inflation to maintain engagement of the interlocking features throughout deployment (preventing the separation of the chute and module housing walls). In a further embodiment, the airbag chute and module housing may substantially deform during an airbag deployment as shown in FIG. 15A, with the airbag blowing through the instrument panel, and yet the mechanical interlocks of the windows and projections are still able to use the internal pressure of the bag inflation to maintain the engagement of the mechanical interlocks. This has the advantage of being able to form the airbag chute and module housing, including the mechanical interlocks, with injection molding of TPO using a single family tool. However, in some embodiments, the airbag chute and module housing may be formed in separate tools, whether or not the airbag chute and module housing are made from the same material.

In more detail, FIG. 5A shows a side view of an embodiment of a mechanical interlocking feature 110. Here, the airbag module housing 102 has a sidewall thickness (or wall stock) of 1.8-3.2 mm, preferably 2.0-3.0 mm, or about 2.5 mm. Within the window 180 of the airbag chute, the sidewall thickness may increase by 0.5-1.5 mm, preferably 0.7-1.2 mm, or by about 1.0 mm to provide increased strength. The total thickness of the airbag module housing, as measured from the projection 111, may be 6.0-8.0 mm, preferably 6.5-7.5 mm, or about 7.0 mm. In addition, the projection itself may have an internal ribbing structure 581. Here, the ribbing structure 581 is horizontal, however, in other embodiments of projections for mechanical interlocks, the projections may have no ribbing, vertical ribbing, or a mixture of both vertical and horizontal ribbing (for instance, forming a window pane shape). The airbag chute 103 may have a sidewall thickness (or wall stock) of 1.8-3.2 mm, preferably 2.0-3.0 mm, or about 2.5 mm. Closer to the window, the airbag chute sidewall thickness may increase by 0.2-0.7 mm, or by about 0.5 mm. The ribbing on the airbag chute may have a height of 2.0-3.0 mm, preferably 2.2-2.8 mm, or about 2.5 mm above the surface of the airbag chute sidewall. In addition, FIG. 5A shows a gap 584 between the airbag chute 103 and airbag module housing 102. In some embodiments, a gap of less than 1.0 mm, preferably less than 0.8 mm, more preferably less than 0.6 mm may exist between the airbag chute 103 and module housing 102 at certain places in the assembly. In other places of the assembly, there may not be a gap, with the outer surface of the module housing and the inner surface of the chute in direct contact with each other.

FIG. 5B shows a plan view of FIG. 5A. The window 180 of the mechanical interlock 110 may have a width of 6.0-11.0 mm, preferably 6.5-10.5, more preferably 7.5-9.5 mm, or about 8.5 mm. The window 180 may have a height of 10-20 mm, preferably 12-18 mm, more preferably 15-16 mm. In some embodiments, the window may be approximately square, and in other embodiments, the longest axis of the window (the length) may be positioned horizontally. This view of the projection 111 shows the horizontal ribbing 581 positioned within, which creates two holes in the projection having the edges of rounded squares. However, the projection in other embodiments may not have a ribbing, in which case the projection may have a single elongated hole. In addition, the plan view of FIG. 5B helps to show the ribbing structure 171, 181 of the airbag chute surrounding the window 180. A segment of vertical ribbing 582 may sit below each window, to help transmit force between the airbag module housing projection 111 and the airbag chute. FIG. 5B also shows that the window 180 is an open window for the projection and sits between two closed windows 583. In this embodiment, the ribbing structure alternates between open and closed windows, and the closed windows have substantially the same height and width as the open windows. In other embodiments, the open and closed windows may have different widths, or the chute may have only open windows and no closed windows. In other embodiments, the airbag assembly may have open windows that do not enclose a projection.

Figure 6A:
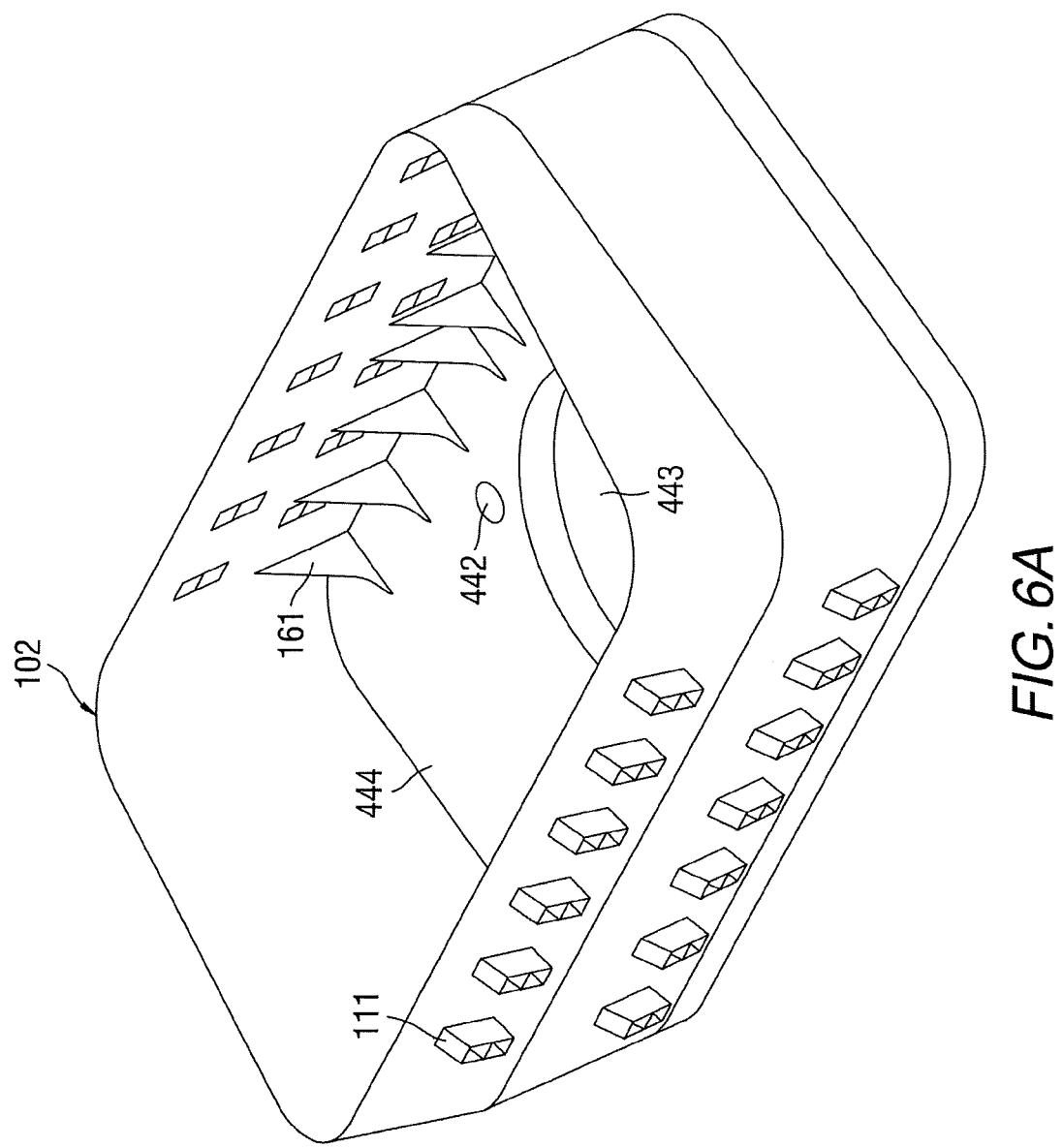
FIG. 6A shows a perspective view of a model used for stress analyses of an airbag module housing in accordance with one embodiment of the invention.

The integral mechanical interlocks on the TPO module housing can also be seen in FIG. 6A. The projections 111 may be positioned into two rows on the long sides of the airbag module housing. Here, six projections are in a top row, and seven are in a bottom row, with the rows being staggered with one another. However, in some embodiments, a different number of rows or projections may be used, or the projections may not be staggered or may be in a different arrangement. In FIG. 6A the ends of the airbag module housing do not have projections, though in some embodiments, such as the airbag assembly shown in FIGS. 4A and 4B, all four sides of a chute and module housing may have projections and windows. In alternative embodiments, an airbag module housing may have one or more open windows to receive a projection from an airbag chute.

It is also envisioned that other designs of mechanical interlocks may be used in an all TPO airbag assembly to secure an airbag module housing within the chute. For instance, mechanical interlocks in the form of ridges, ratchets, round protrusions, angled protrusions, pins, treads, tabs, hooks, grooves, or other fastener mechanisms may be used. In some embodiments, different types of mechanical interlocks may be used within a single airbag assembly.

In one embodiment, one or more fastener mechanisms to attach the airbag module housing and the airbag chute may be formed integrally with the module housing or chute. In other embodiments, the fastener mechanism may include other parts, made of TPO or other materials. For instance, the fastener mechanism may include nuts and bolts, screws, bands, straps, belts, buckles, zip ties, latches, or hinged connectors. In another embodiment, the module housing and chute may be attached by adhesives or by welding, with or without mechanical interlocks or other fasteners.

FIG. 6A also shows the interior of the airbag module housing 102. Here, the interior has an opening 443 to house the pancake inflator, or some other inflator, and one of four bolt holes 442 is visible and may be used to attach the inflator or some other structure to the airbag module housing. FIG. 6A also provides a view of the interior gussets 161. As mentioned earlier, each long wall has eight interior gussets which are spaced equally except for the middle two, which are spaced more closely together. For instance, the middle two gussets may be spaced by about ½ inch, while the other three gussets on each side of those middle two may be spaced by about 1 inch. In alternative embodiments, only one of the long walls may have interior gussets, or may have a different number of gussets or gussets of different spacing. The interior gussets may be of substantially similar shapes as in FIG. 6A, or two or more gussets may have different shapes. Preferably, the interior gussets have thicknesses such as those mentioned previously for the sidewall thickness or wall stock.

Figure 6C:
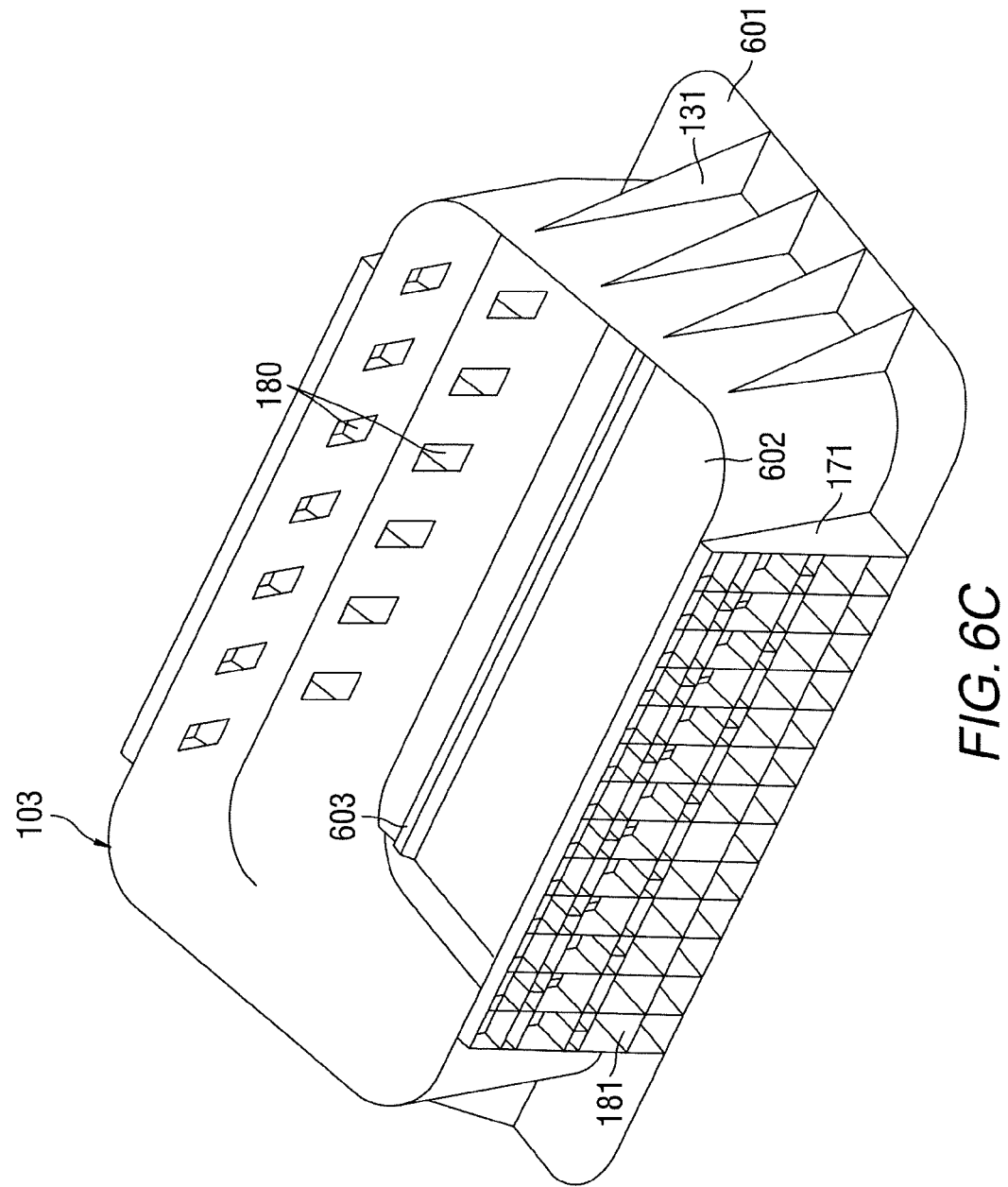
FIG. 6C shows a bottom perspective view of a model of an airbag chute designed to fit together with the module housing of FIG. 6A.

Open windows 180 with reinforced ribbing on the airbag chute 103 can also be seen by the views in FIGS. 6B and 6C. Here, four gussets 131 on each of the two ends of the airbag chute have equal spacing and have heights that vary with the angle of the chute. In other embodiments, the two ends of the chute may have a different number or spacing of gussets, or gussets of substantially the same shape. In addition, the shallow gussets, or vertical ribs 171, are spaced evenly with one another on the long walls and intersect multiple horizontal ribs 181. Open windows 180 and closed windows 181 sit within this framework. FIG. 6C shows that the interior of the airbag chute 103 does not have ribs, gussets, or other projecting features. The open windows 180 are also visible. Both FIGS. 6B and 6C show that the vertical ribs 171 and gussets 131 connect the exterior sides of the airbag chute to a flanged surface 601. Within the flanged surface, or otherwise at the top of the airbag chute, are instrument panel doors 602 that open under the pressure of an expanding airbag. These doors 602 may be attached to the airbag chute with a living hinge 603, though in other embodiments, a surface may be sufficiently thin or flexible that a living hinge is not needed. These doors may function to protect a deploying airbag from tearing against the inside of an erupting instrument panel. In other embodiments, the doors may be joined by a breakable surface that may be weakened along a line, for instance, the line may be scored in order to have a reduced thickness. In alternative embodiments, the doors may not be needed if an airbag can safely deploy through the instrument panel on its own without tearing, and in other embodiments, the instrument panel itself may be scored along a line or weakened in certain areas to assist air bag deployment. In one embodiment, a scored surface or scored seam on the instrument panel and/or between the doors may have a thickness reduced by at least 10%, at least 25%, at least 40%, at least 50%, at least 60%, or at least 70%. The scored surface or scored seam may have an average thickness in a range of 0.5-3.0 mm, preferably 1.0-2.5 mm, more preferably 1.2-2.0 mm, 1.3-1.7 mm, or about 1.5 mm. The living hinge 603 shown is molded as an integral part of the chute and is shown generically as the type of hinge normally used for TPO chutes. In other embodiments, the hinge may consist of an insert molded scrim or fabric to perform the hinging function. All established hinge types (integrally molded plastic or inserted fabric), and instrument panel constructions (hard and soft) can be used with this concept that applies to an all TPO chute and module housing assembly.

Figure 7A:
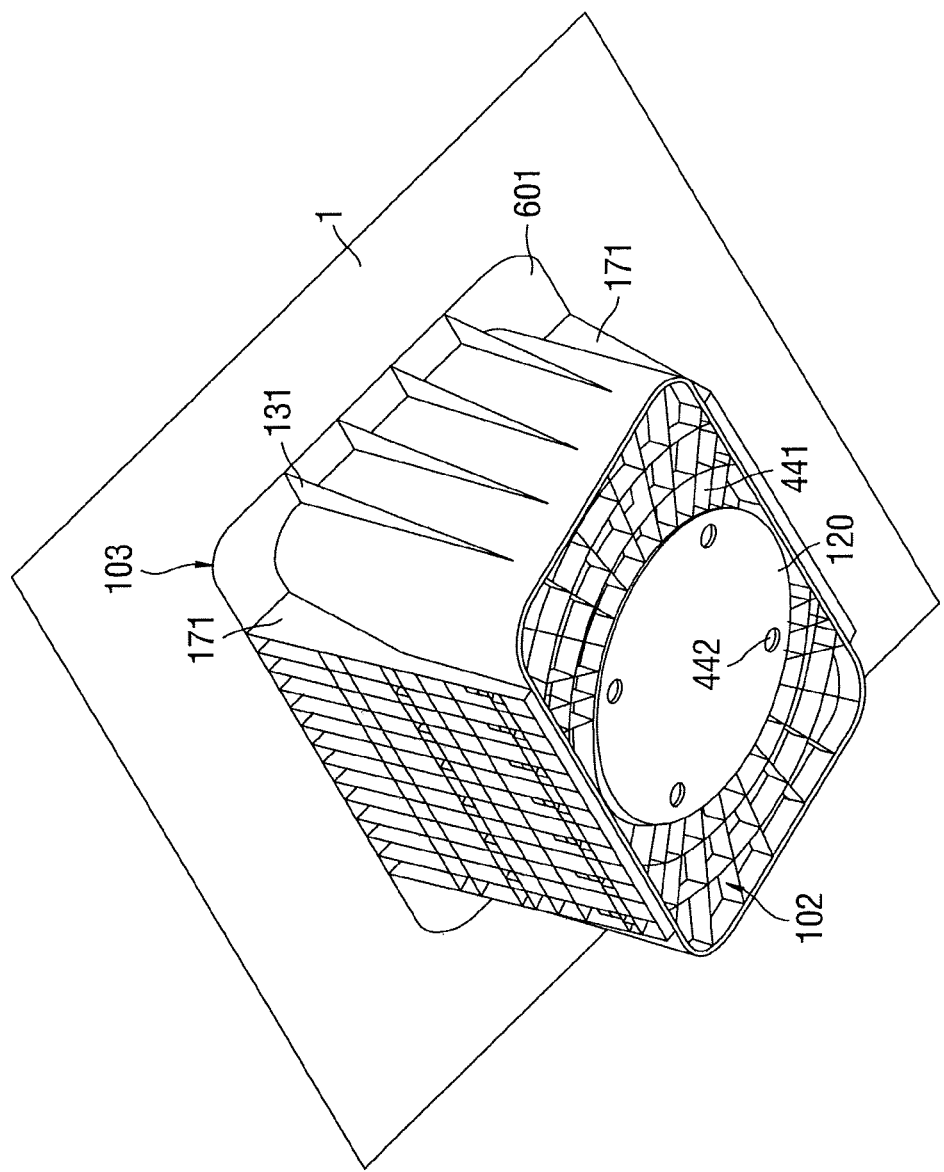
FIG. 7A shows a perspective view of a model of a module housing and airbag chute together in an assembly in accordance with one embodiment of the invention.

FIGS. 7A and 7B show the assembly between the airbag chute 103 and the module housing 102, which is accomplished by sliding the module housing into the bottom of the chute. A part of the instrument panel 1 is represented above the airbag chute 103, connected to the flanged surface 601. The assembly is typically fastened to the instrument panel 1 via vibe-welding the flange 601 of the chute. In related embodiments, the airbag chute may be fastened to an instrument panel 1 by top-loading (snapping in) a chute into an instrument panel retainer (normally glass-PP) followed by in mold foaming between the retainer and surface skin, especially in the case of skin and foamed instrument panels. The TPO module housing invention may be used with all types of instrument panel, including hard, foam in place (skin and foam), and leather wrapped hard instrument panels that start with a hard IP construction and are subsequently wrapped, intended for high end instrument panels and vehicles. As mentioned previously, the instrument panel 1 may also comprise TPO. In some embodiments, the airbag module housing 102 may be attached or secured to the instrument panel 1 by adhesives or mechanical interlocks. For instance, rather than a flange, the airbag chute 103 may have flexible tabs or protrusions that form a snap fit into a frame formed into the bottom surface of the instrument panel.

Figure 8:
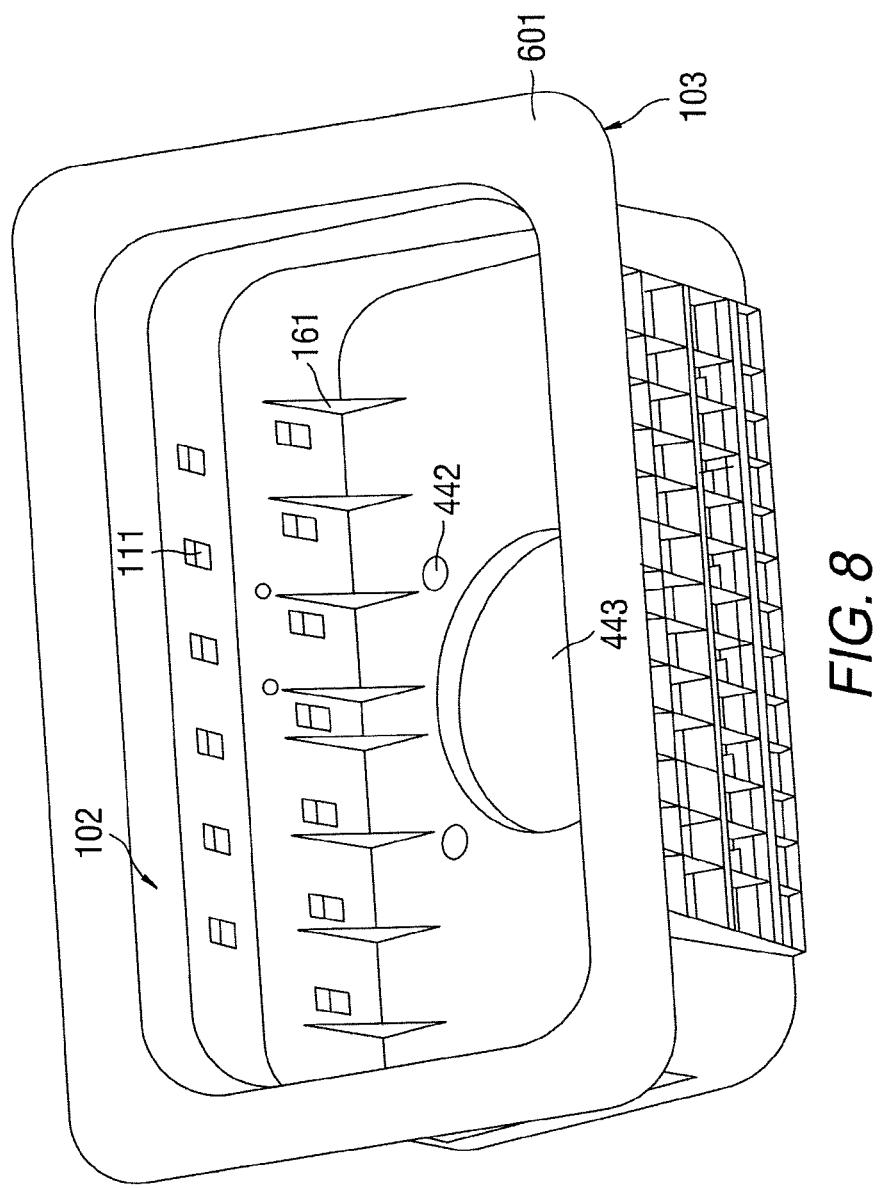
FIG. 8 is a top perspective view of an airbag assembly looking down into the opening of the assembly in accordance with one embodiment of the invention
Figure 9:
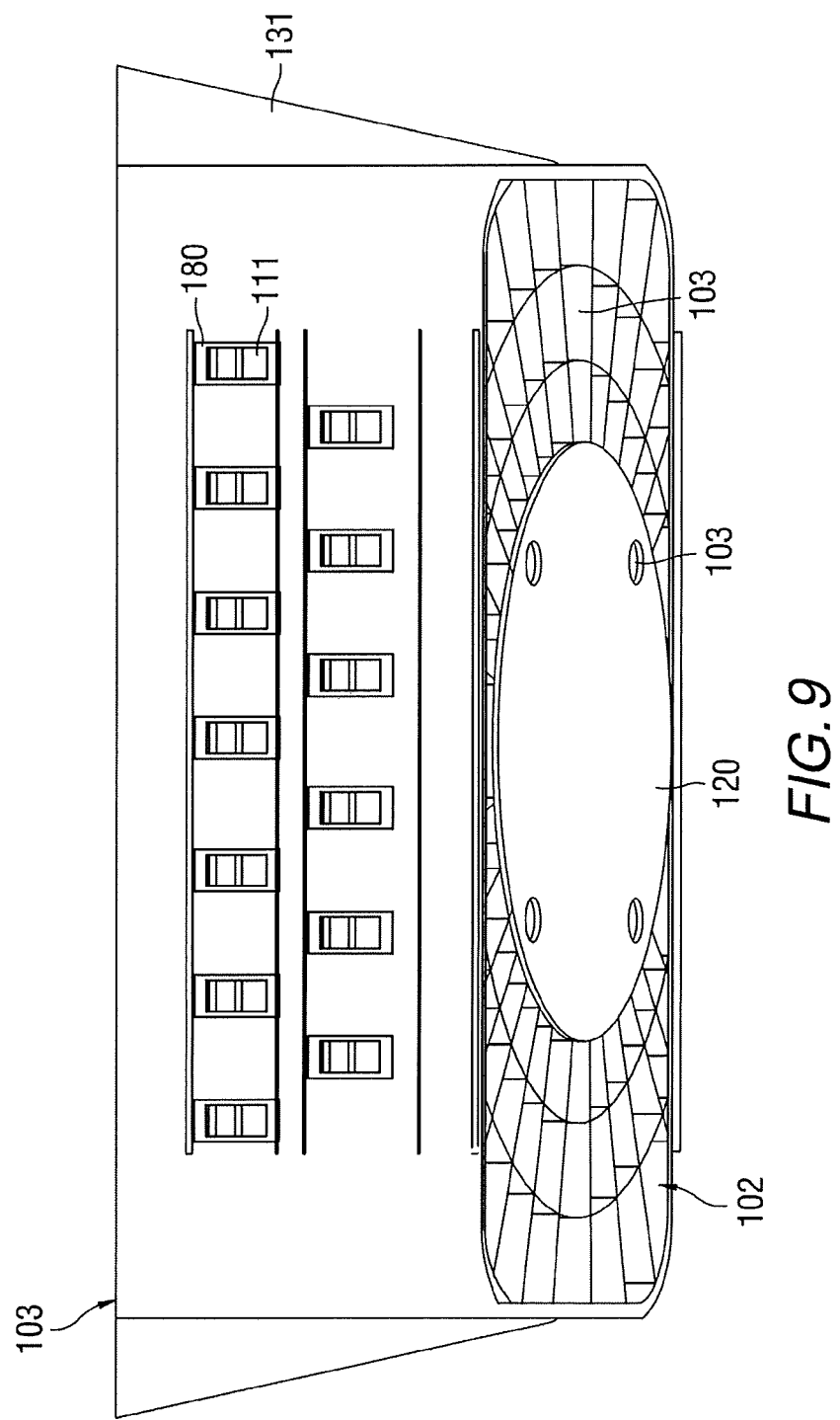
FIG. 9 is a perspective side and bottom view of an airbag assembly prior to applying internal pressure in accordance with one embodiment of the invention.

FIGS. 8 and 9 illustrate embodiments of the assembled airbag chute 103 and module housing 102 prior to applying loads or internal pressure. The instrument panel and instrument panel doors are not shown. The embodiments of FIGS. 8 and 9 were used to perform transient nonlinear stress analyses to prove that the structural design of the inventive airbag assembly is able to withstand forces similar to those experienced during an airbag deployment and under raised temperatures, despite both module housing 102 and chute 103 being made from TPO.

An important material characteristic of the TPO airbag assembly is its inherent toughness and cold ductility. Being a thermoplastic, TPO exhibits lower strength and reduced stiffness at elevated temperatures, which may result in substantial deformation, such as ballooning. However, even at elevated temperatures, up to 85° C., the TPO airbag assembly shows nowhere near the level of deformation or material strain that would cause failure or cracking during an airbag deployment.

Figure 10:
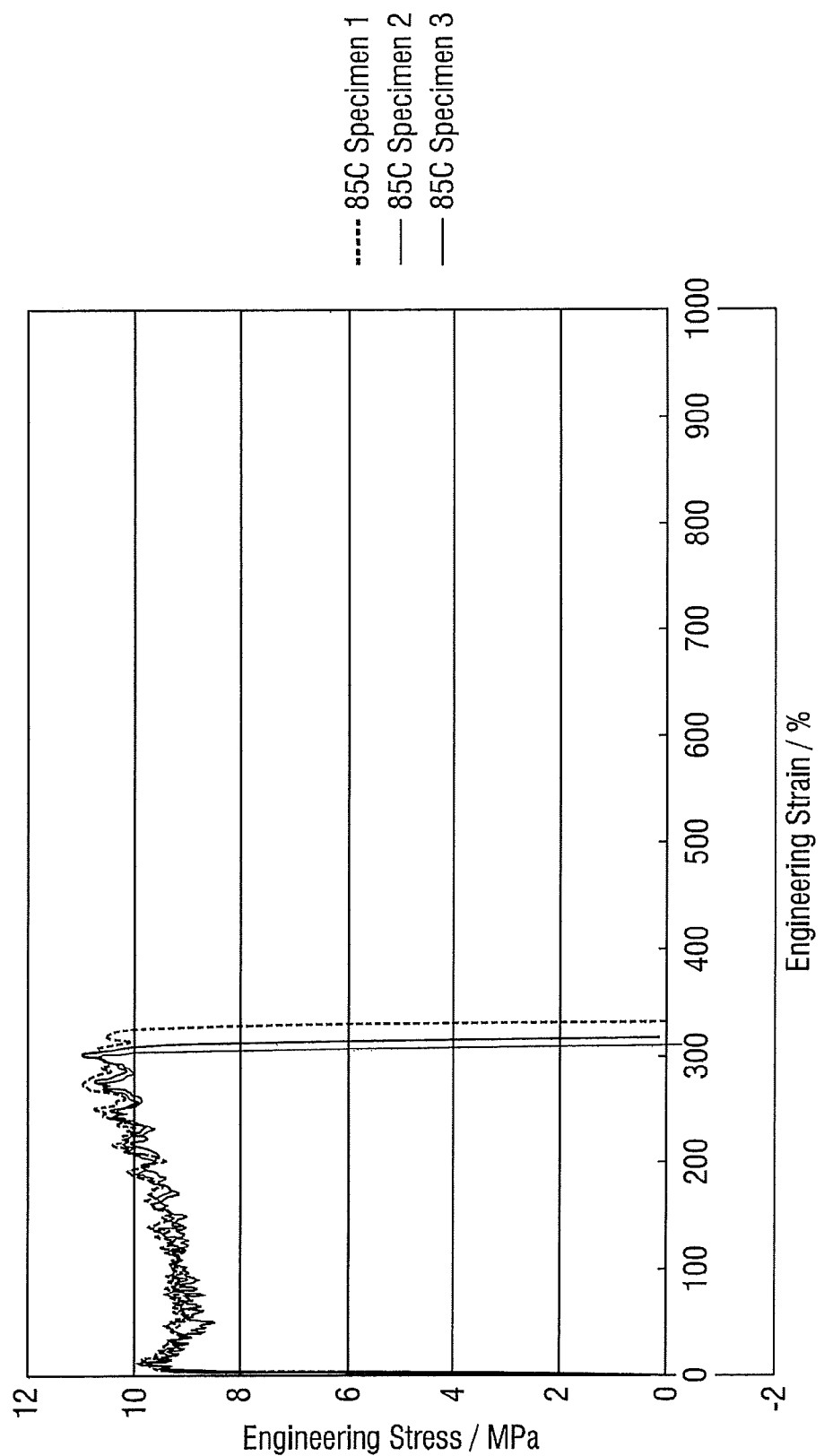
FIG. 10 shows a high speed tensile engineering stress-strain response of a TPO sample at an elevated temperature (85° C.) and a high load rate (10 m/sec crosshead test speed).
Figure 11:
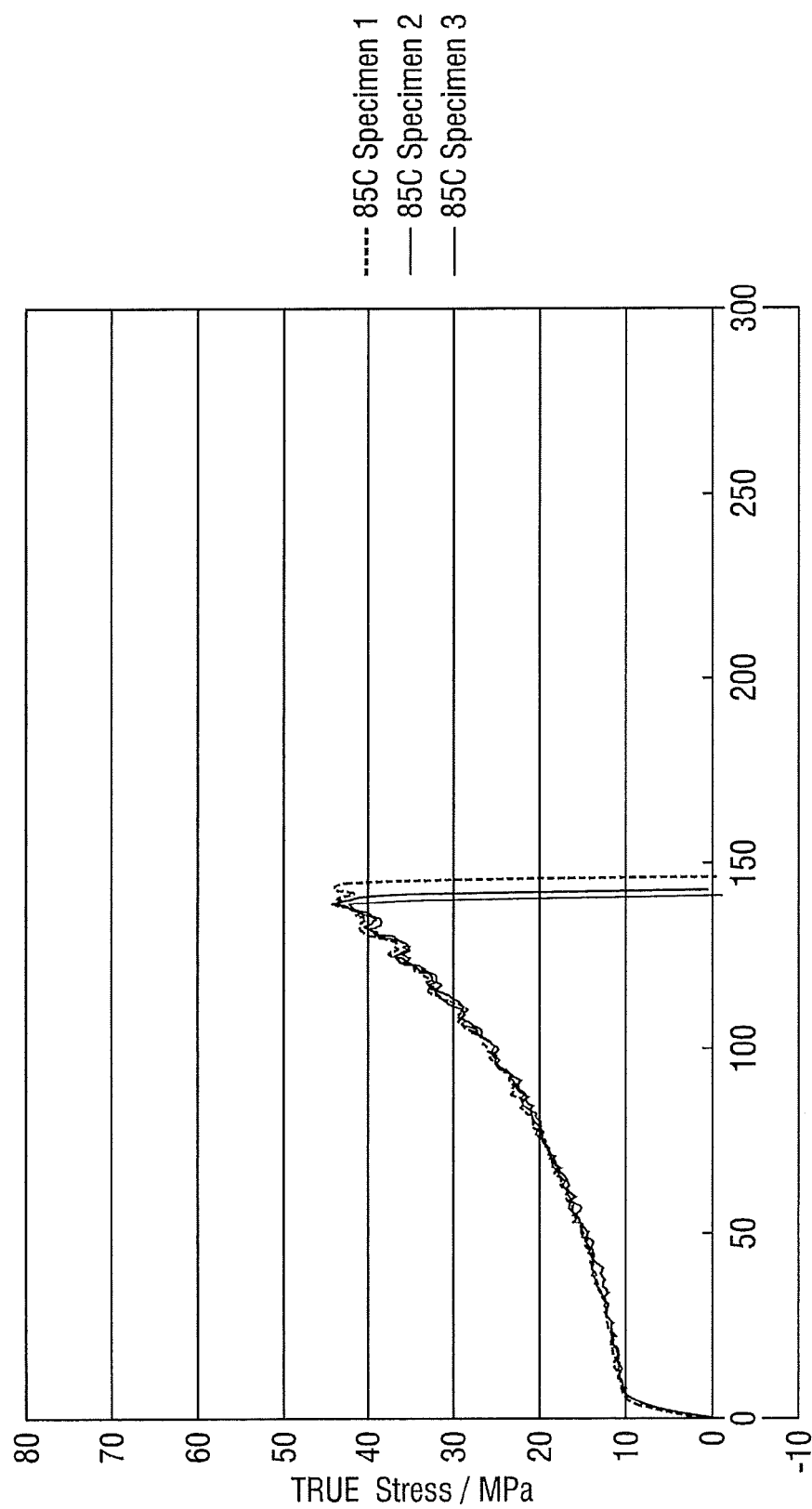
FIG. 11 shows a high speed tensile true stress-strain response of a TPO sample at an elevated temperature (85° C.) and a high load rate (10 m/sec crosshead test speed).

FIGS. 10 and 11 provide fundamental engineering and true stress-strain curves, respectively, for this specific type of TPO, generated at a high test speed of 10 m/sec or ~1000/sec material strain rate, and at a temperature of 85° C. The engineering stress-strain curves are calculated with the assumption that the cross-section area stays constant while under tension, and the true stress-strain curves consider the contraction of the cross-section area in calculating the strain. These fundamental material properties were used for the transient nonlinear stress analyses to ensure the structural resilience of the airbag assembly under airbag deployment when the material and environmental conditions represent a "worst case" condition. Deployment performance at room temperatures and colder temperatures are not expected to cause any issues due to the higher strength, stiffness, and strain capability of the TPO. In fact, at room temperatures and colder, the all TPO airbag assembly becomes more robust in performance. The TPO used to generate FIGS. 10 and 11, defined as TT969NU, is commonly used for airbag chutes in the automotive industry, though other product grades may be used. As mentioned previously, a critical functioning temperature for testing the airbag assembly is 85° C. due to the reduction in strength and stiffness for these all TPO airbag assemblies and the expectation that this temperature would not be exceeded during a real-world deployment. Thus, the dynamic stress analyses were performed with the airbag assembly at 85° C.

Figure 12A:
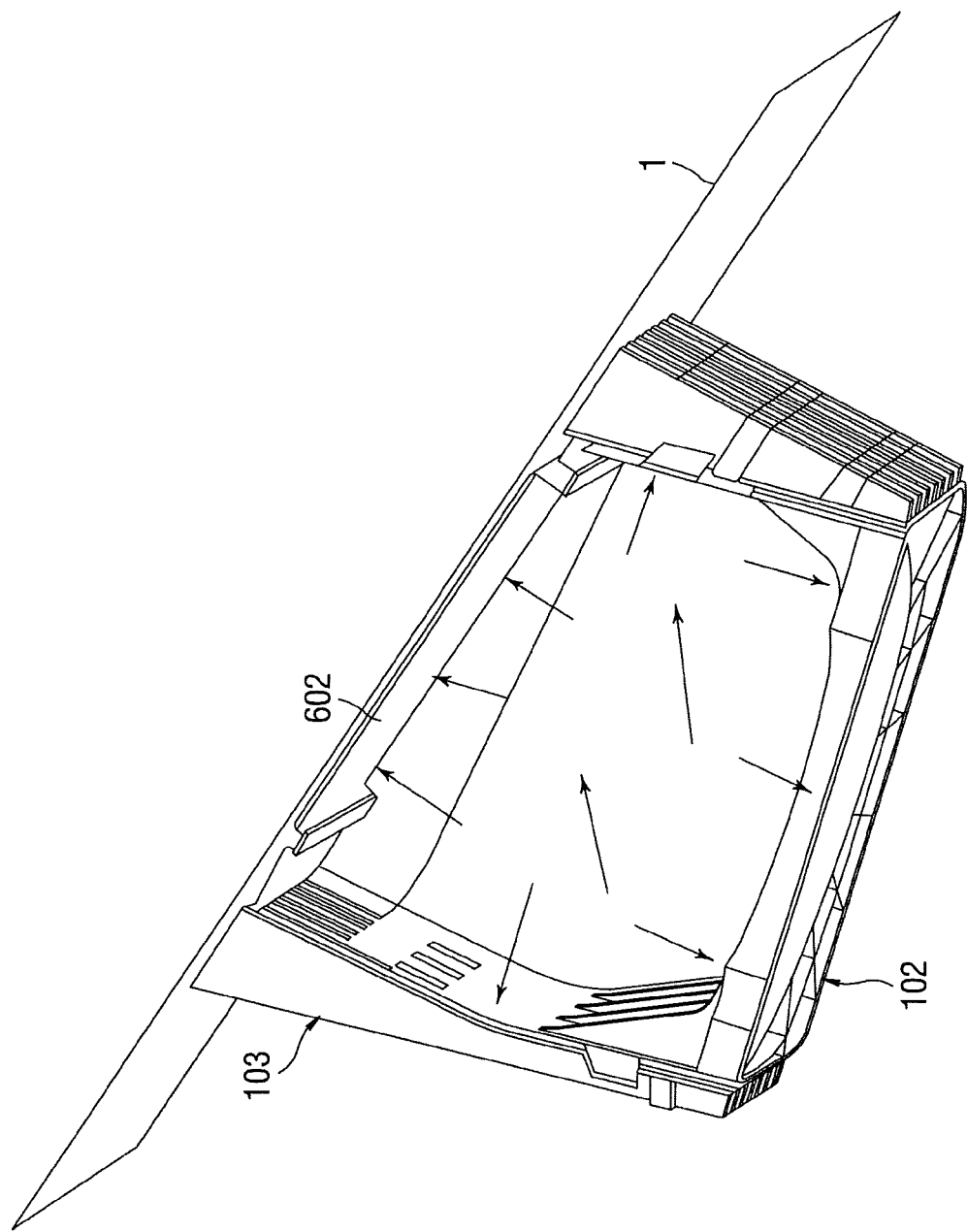
FIG. 12A illustrates loading forces applied for deployment simulation and dynamic stress analysis of an airbag assembly and instrument panel in accordance with one embodiment of the invention.

FIG. 12A gives an illustration of the internal pressure of the stress analysis, as represented by arrows. All internal surfaces of the module housing 102 and chute 103 are subjected to the internal pressure, and for the stress analysis, a metal plate 120 is attached at the bottom of the module housing 102 to simulate a pancake inflator housing. This pancake inflator is also affixed to the car crossbeam via a steel bracket for additional support during a deployment event and to help react the load of the occupant to the airbag. The pancake inflator housing and its attachment to the car crossbeam are both typical of passenger side airbag systems.

Figure 13A:
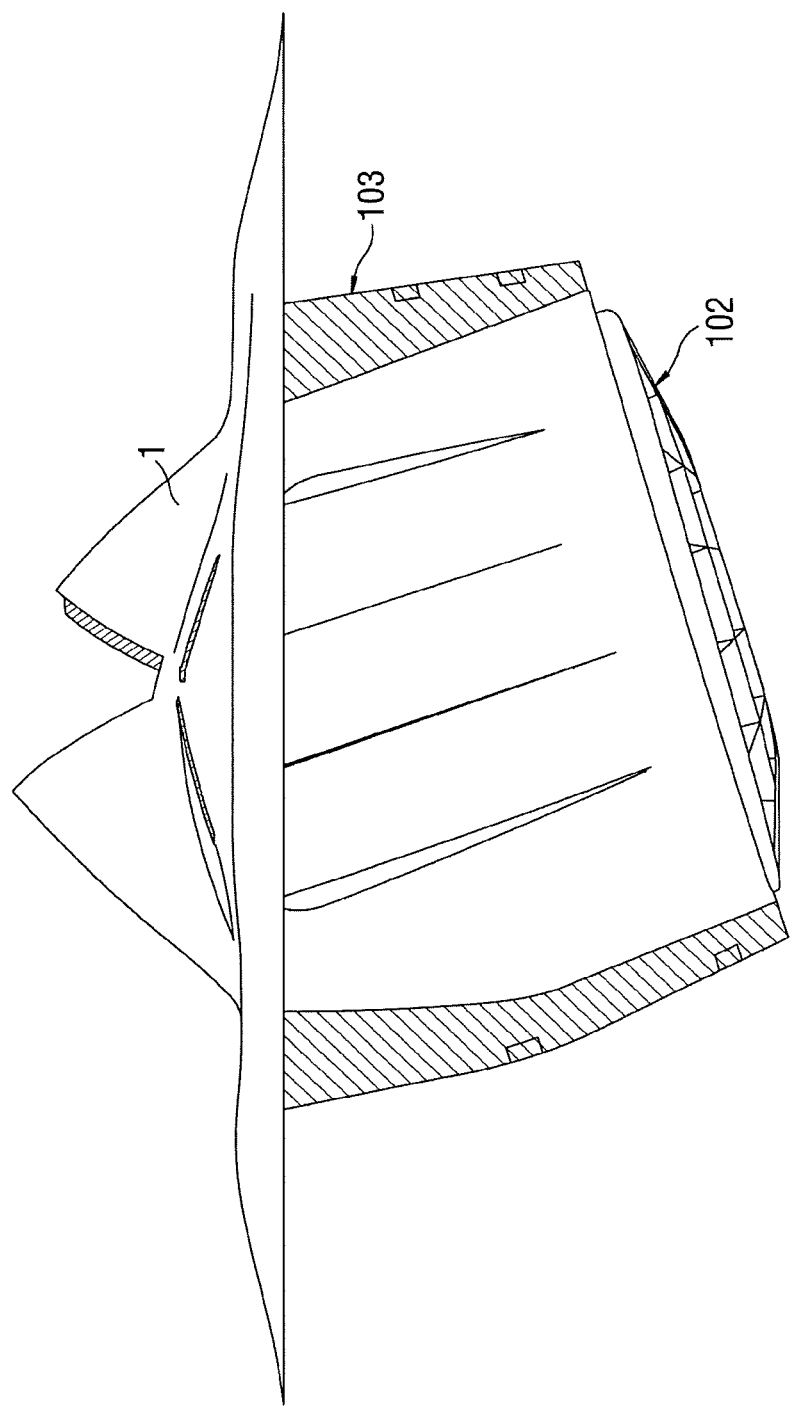
FIG. 13A shows a first side snapshot of a simulation of a model of a loaded airbag system assembly in accordance with one embodiment of the invention at 6.5 milliseconds into the load cycle shown in FIG. 12B as the instrument panel doors start to open.
Figure 13B:
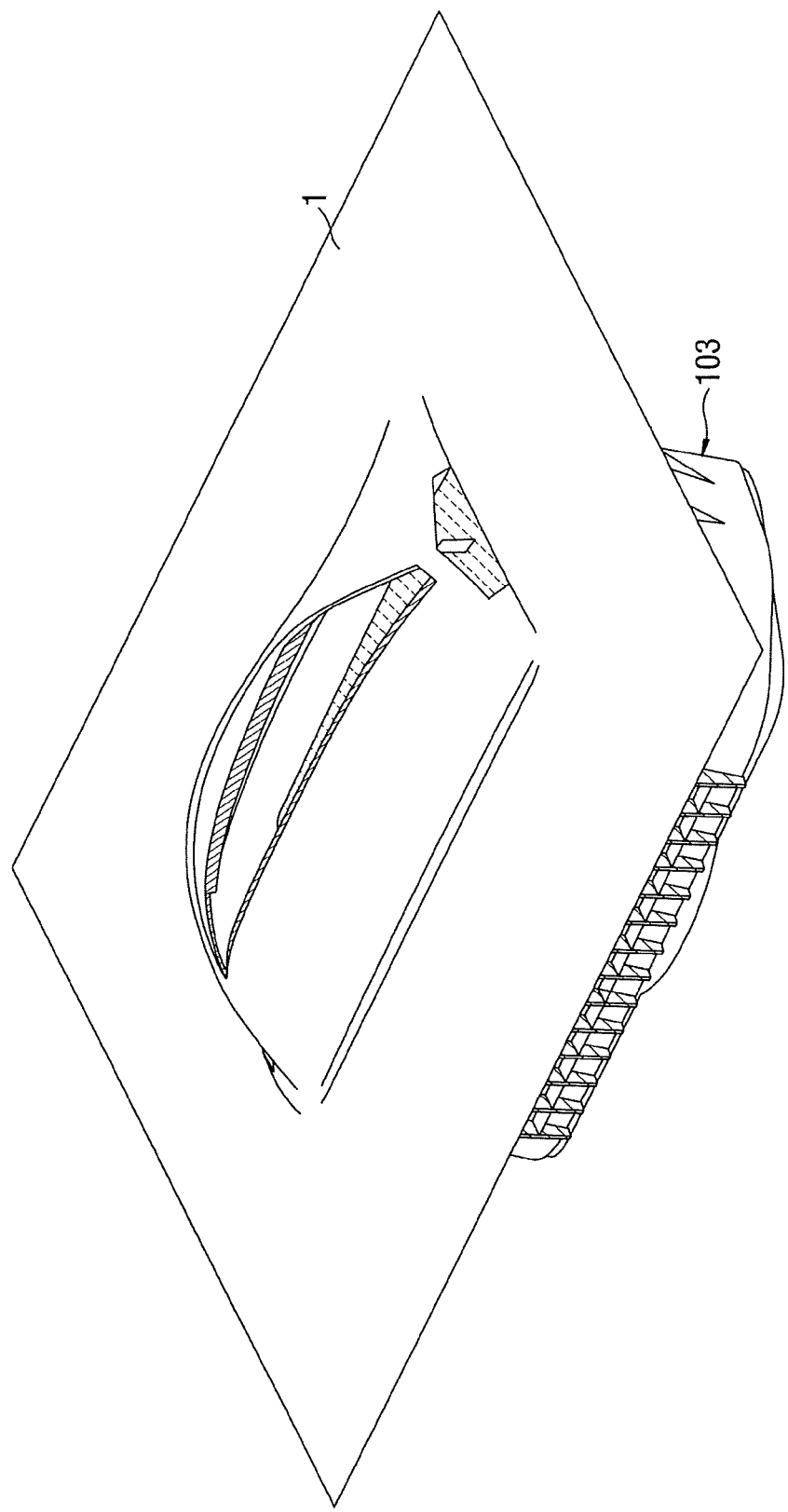
FIG. 13B shows a top perspective snapshot of the loaded airbag system assembly of FIG. 13A at 6.5 milliseconds into the load cycle.
Figure 14A:
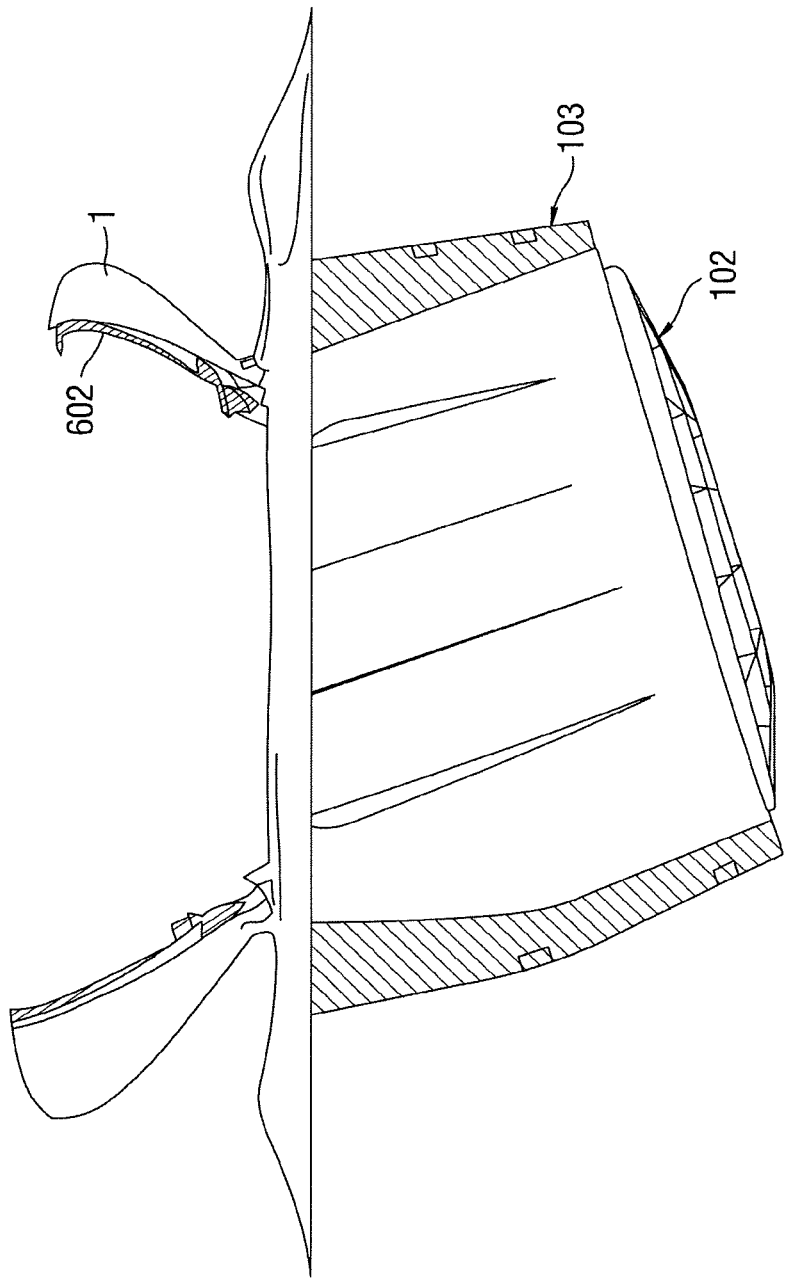
FIG. 14A shows a first side snapshot of a simulation of a model of a loaded airbag system assembly in accordance with one embodiment of the invention at 7.5 milliseconds into the load cycle shown in FIG. 12B as the instrument panel doors are fully open.
Figure 14B:
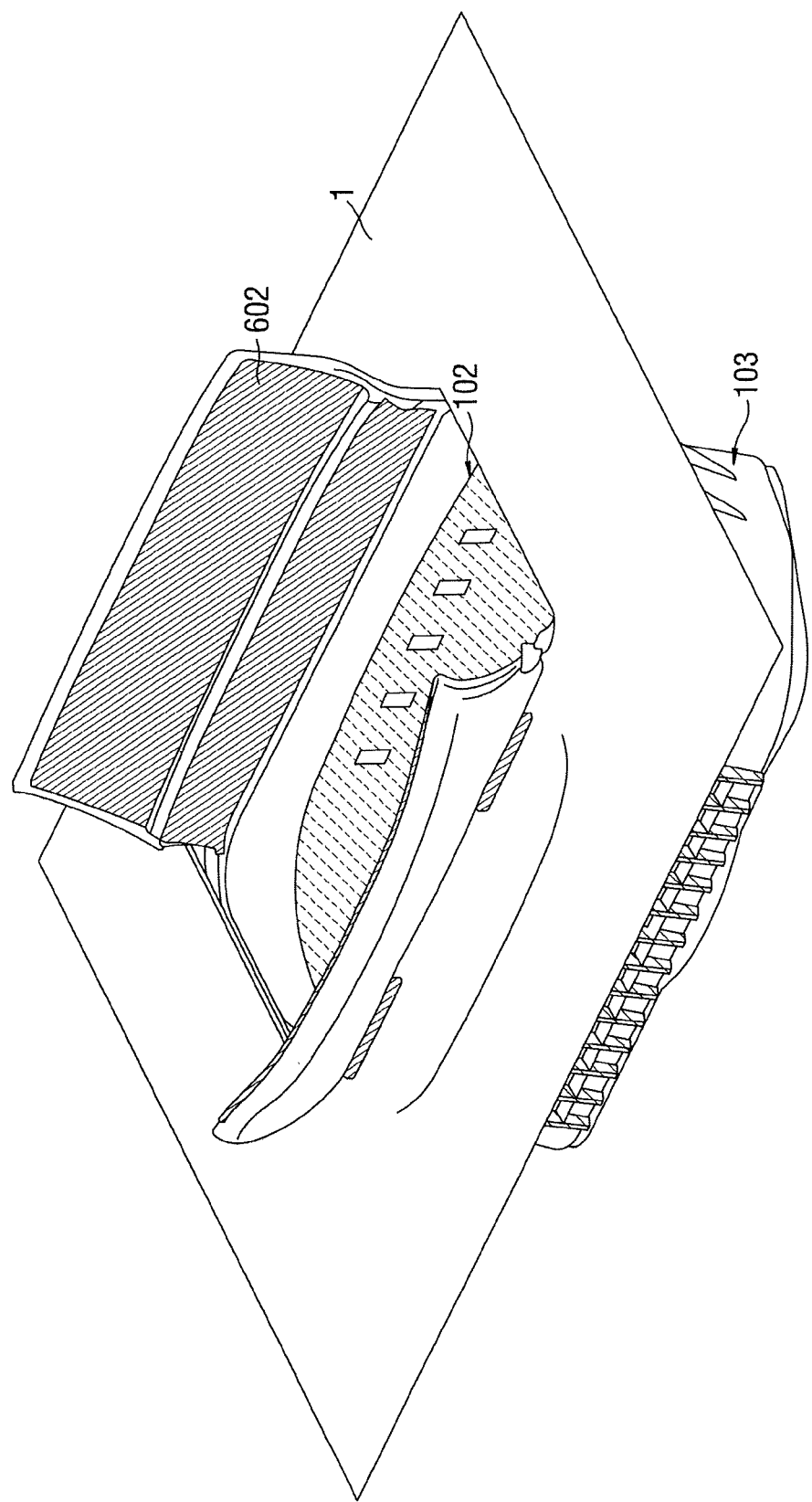
FIG. 14B shows a top perspective snapshot of the loaded airbag system assembly of FIG. 14A at 7.5 milliseconds into the load cycle.
Figure 14C:
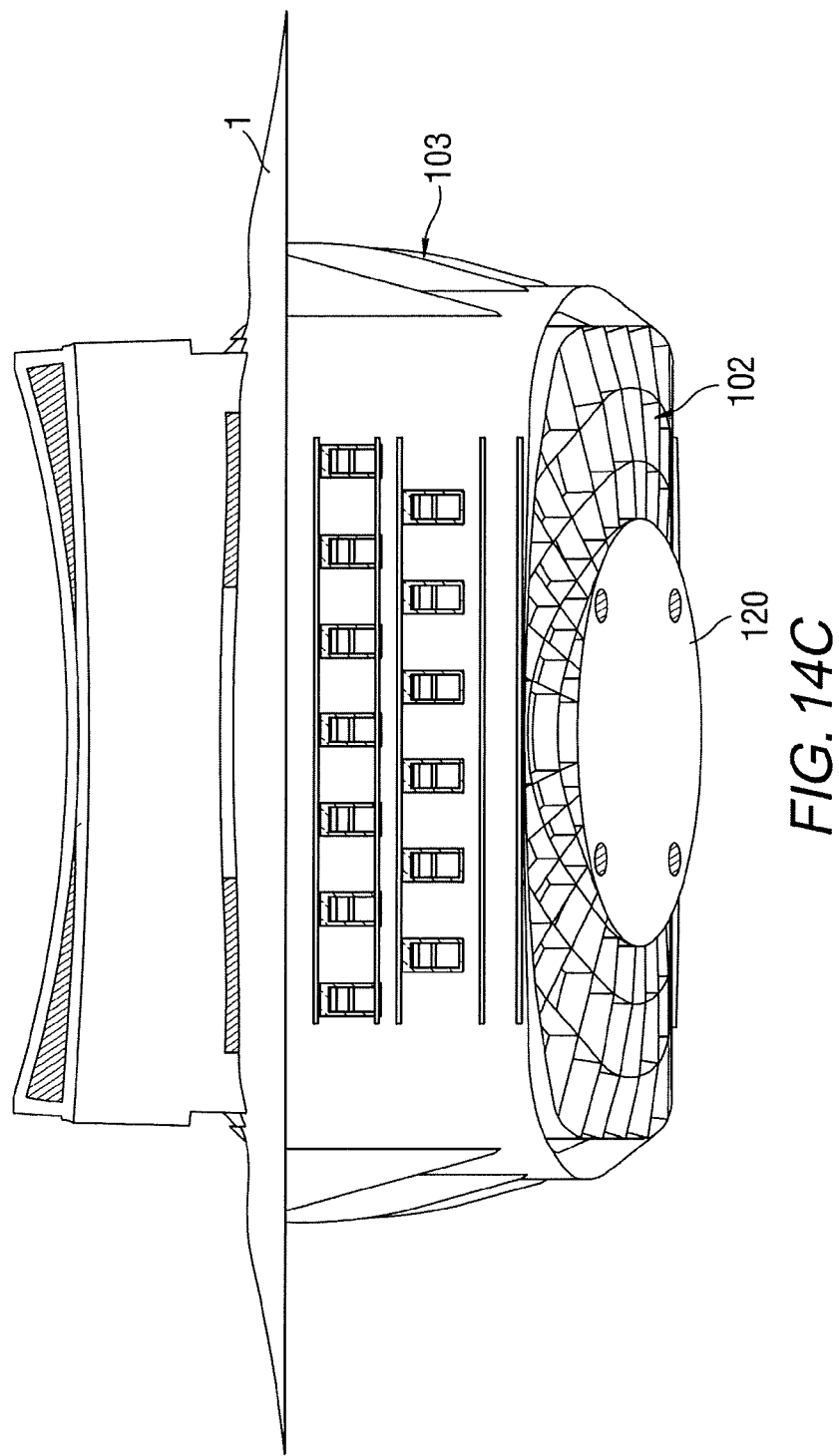
FIG. 14C shows a longitudinal bottom perspective snapshot of the loaded airbag system assembly of FIG. 14A at 7.5 milliseconds into the load cycle.
Figure 15B:
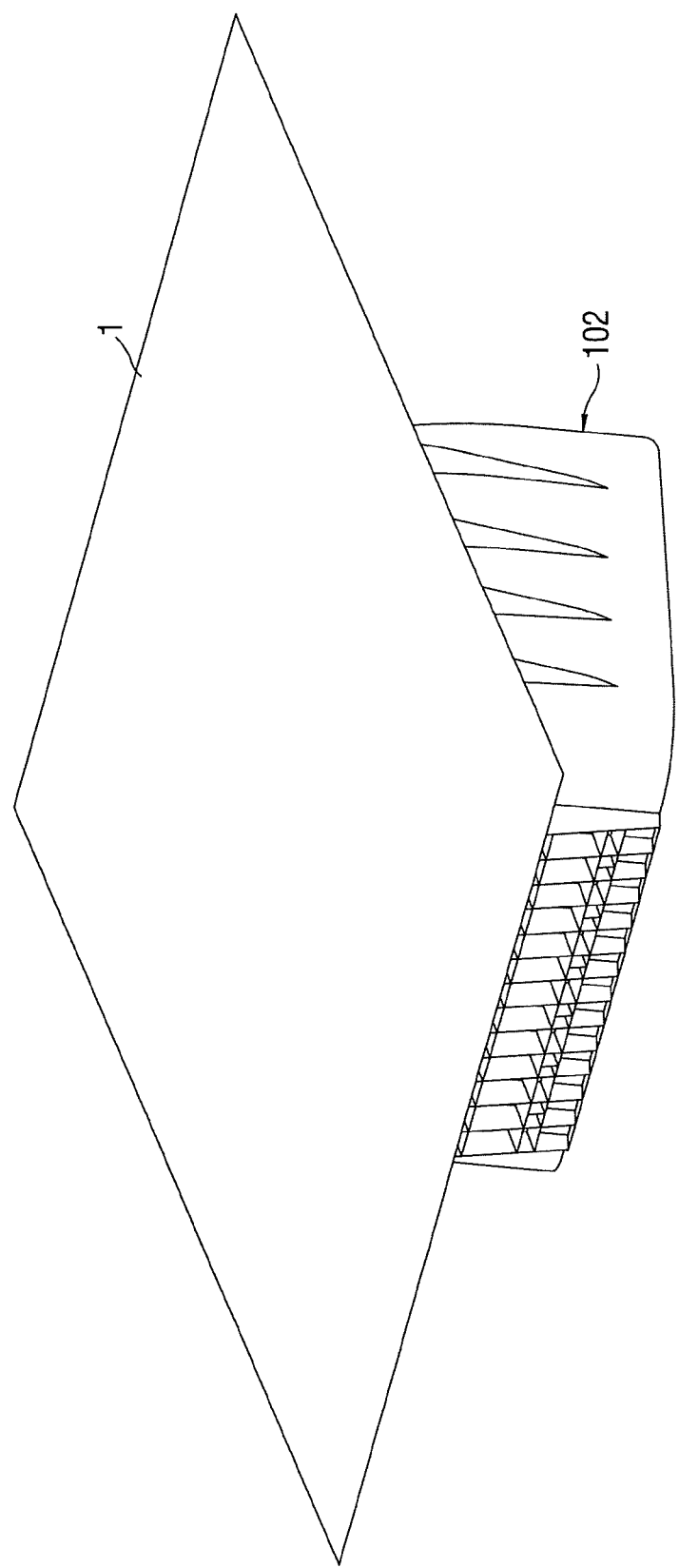
FIG. 15B shows a perspective view the airbag assembly of FIGS. 13A-C and 14A-C before being subjected to the load cycle.

FIG. 12B shows the load cycle applied for the stress analysis, which simulates a typical deployment, where the internal pressure increases from 0 to 150 psi in 5 milliseconds. This pressure is held for an additional 5 milliseconds before immediately ramping down to 0 psi. These 10 milliseconds are generally enough time to allow the airbag to begin to blow through the instrument panel and have the internal pressure on the TPO airbag assembly begin to dissipate. The results of the deployment simulations are best illustrated by the snapshots of the openings shown in FIGS. 13A-C, 14A-C, and 15. FIG. 15B shows an isometric view of the airbag assembly at 0.0 milliseconds and FIG. 15A shows a view of the airbag assembly after deployment at 8-9 milliseconds. FIGS. 13A-C show views of the airbag assembly at 6.5 milliseconds into the stress analysis, and FIGS. 14A-C show the same views at 7.5 milliseconds into the stress analysis. It should be noted that in this stress analysis, the interior surface pressure was continued throughout the load cycle. In other words, the pressure was not reduced or removed from the interior surfaces to account for the airbag deploying through the instrument panel 1 and fully inflating.

Figure 16:
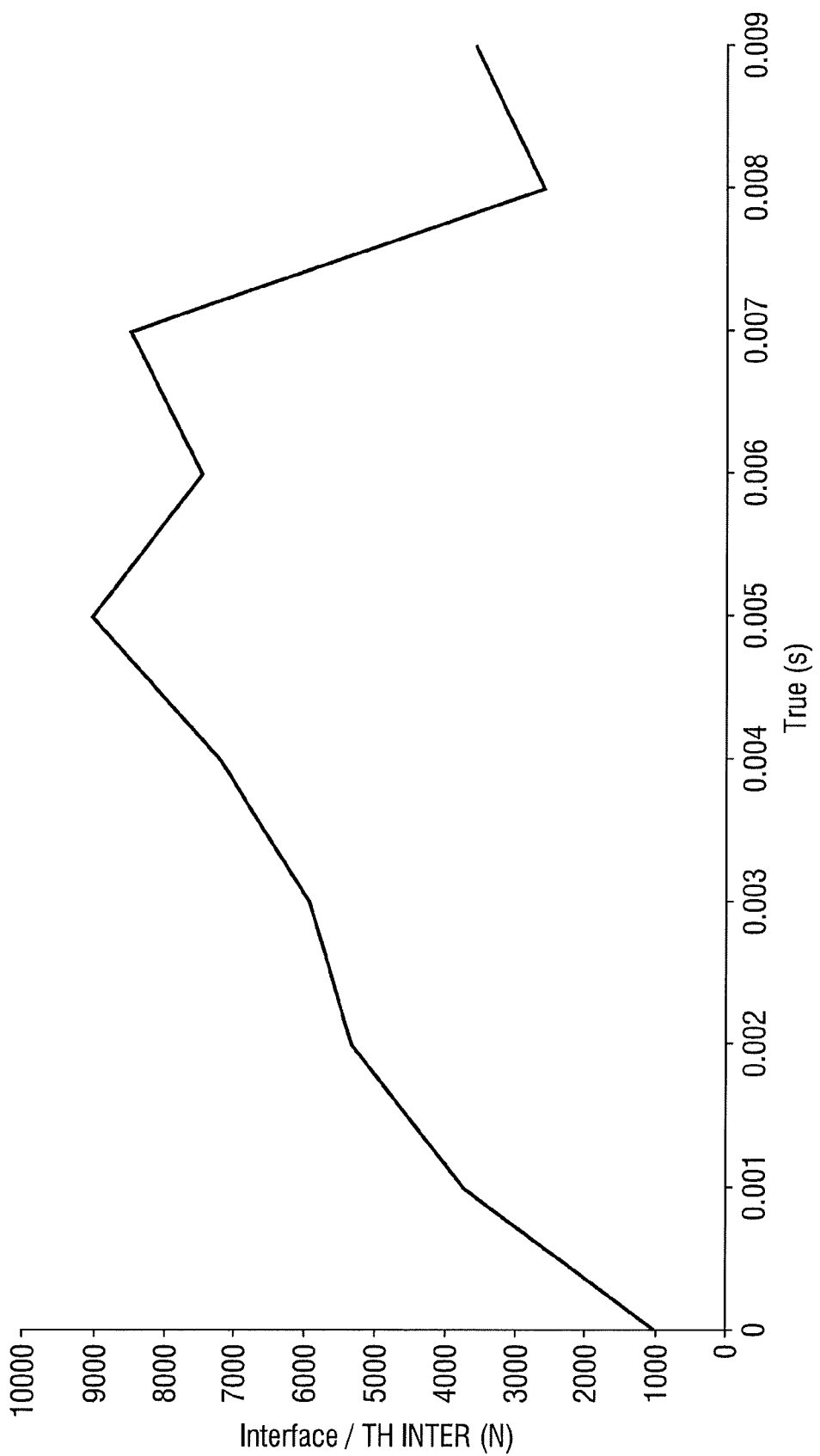
FIG. 16 shows a plot of cumulative interface force as a function of internal pressure applied to interior surfaces as a function of time during airbag deployment in accordance with a simulation of one embodiment of the invention.

FIG. 16 shows the cumulative contact force ascertained from the stress analysis. This depicts the total load build up on the internal surfaces of the TPO airbag system upon pressurization and as the instrument panel doors 602 opened to simulate the bag blowing through the instrument panel surface 1. As seen by this load curve and the deformed models during various time intervals (in FIGS. 13A-C and 14A-C), the airbag system was able to maintain its assembly and engagement throughout the load cycle, meaning that the module housing 102 was able to stay connected within the airbag chute 103, and the sidewalls of either did not fracture or break. This is despite encountering a maximum force of 9016.15 N at 5 milliseconds. In one embodiment, the airbag assembly may withstand internal pressures of 60-150 psi, 60-90 psi, 90-120 psi, 120-150 psi, or 120-180 psi. In one embodiment, the airbag assembly can withstand internal pressures of up to 60 psi, preferably up to 90 psi, more preferably up to 120 psi, even more preferably up to 150 psi while at temperatures of up to 40° C., preferably up to 55° C., more preferably up to 85° C., even more preferably up to 90° C. In one embodiment, the airbag assembly can withstand internal pressures of 60-150 psi, 60-90 psi, preferably 65-87 psi, more preferably 70-85 psi, or about 80 psi while at a temperature of 80-90° C., preferably 82-88° C., more preferably 84-86° C., or about 85° C. In one embodiment, those internal pressures may be applied for a time period of 2 milliseconds (ms)-10 s, preferably 5 ms-1 s, more preferably 8 ms-50 ms. In other embodiments, the internal pressure may be applied for at least 5 ms, preferably at least 10 ms. In some embodiments, the airbag assembly may withstand an unequal distribution of interior pressures resulting from an airbag deployment. As mentioned earlier, the airbag assembly has a greater strength at lower temperatures. In one embodiment, the airbag assembly may withstand internal pressures of 60-150 psi, 60-90 psi, 90-120 psi, 120-150 psi, 120-180 psi, or greater than 180 psi while at a temperature of 4-80° C., or 15-40° C., or 20-30° C. As defined here, the airbag assembly being able to withstand an internal pressure means that the module housing 102 stays connected within the airbag chute 103, and the sidewall of the module housing and chute did not fracture or break during the application of the internal pressure. In some embodiments, after withstanding the application of internal pressure, the airbag assembly may become slightly deformed, such as being stretched or strained. In some embodiments, the "application of internal pressure" is due to an airbag deployment. It is equally envisioned that the airbag assembly is able to withstand exterior forces of similar magnitudes, being applied at different sides of the airbag assembly, and under similar ranges of temperature.

FIGS. 17 and 18 show another embodiment of an airbag assembly 100 where the module housing 102 and chute 103 are again made of TPO. FIG. 17 shows the airbag assembly closed with the instrument panel 1 intact; FIG. 18 shows the airbag assembly opened, for instance, after deploying an airbag. Here, the module housing 102 is not inserted into the chute 103 as shown in earlier embodiments. Instead, the module housing 102 is fastened by bolts or screws 802 to the chute 103, and the chute is fastened to an instrument panel substrate 800 attached directly underneath the instrument panel 1. The bolts may use a threaded insert 810 to secure the airbag chute 103 and a flanged nut 814 to secure the module housing 102. In this embodiment, an interlocking mechanism of windows and projections may not be required. As in previous embodiments, the sides of the chute 103 and module housing 102 may offset from a perpendicular angle with the plane of the instrument panel 1. The forward part of the car is indicated by the arrow 707.

Figure 19B:
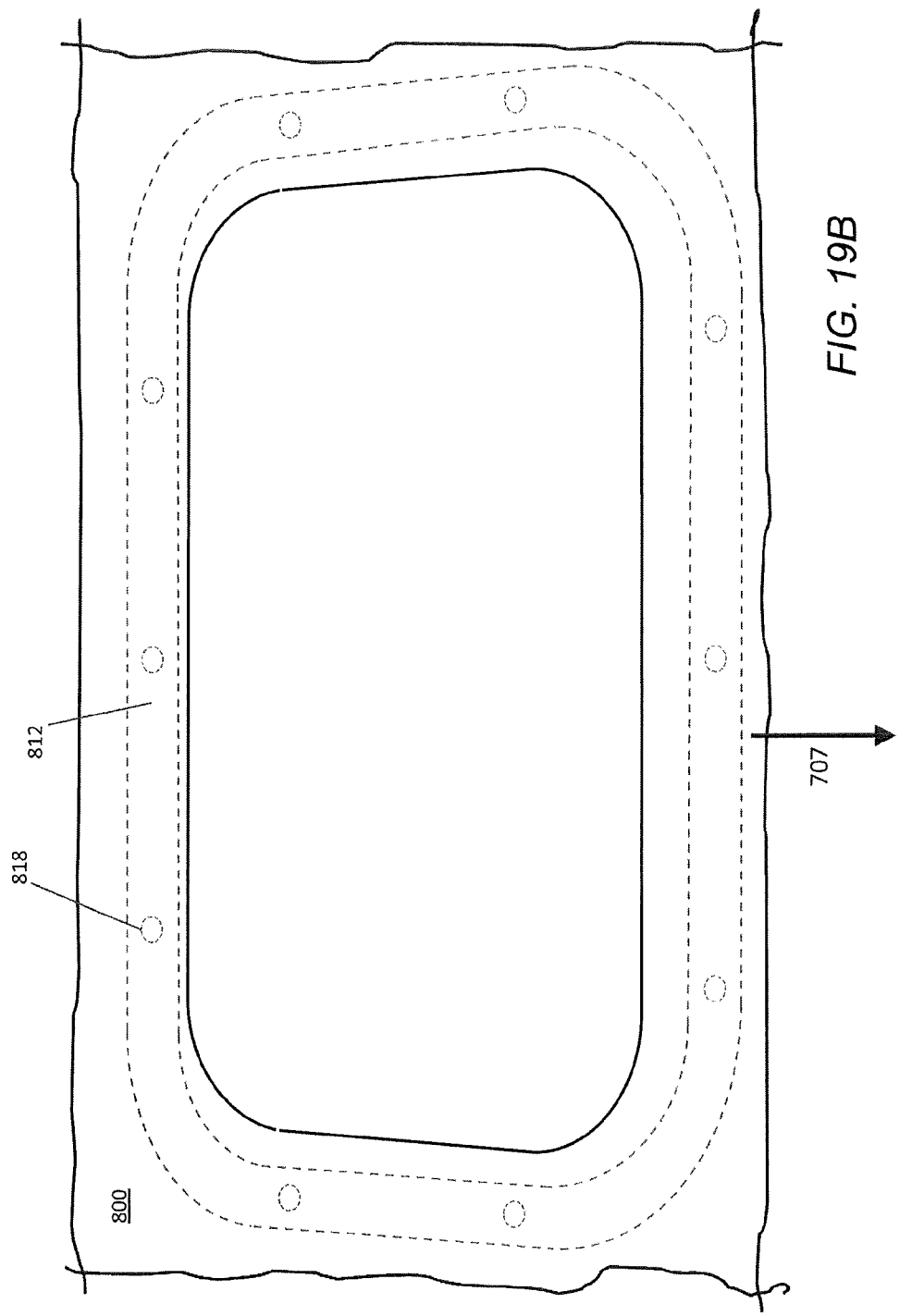
FIG. 19B is the instrument panel substrate of FIG. 19A showing the position of the hoop tension ring underneath.

In further detail, FIGS. 17 and 18 show an instrument panel 1 comprising a top layer of film or skin 806 and a bottom layer of foam 808. The instrument panel 1 may instead be similar to that previously described. The instrument panel 1 is supported by the instrument panel substrate 800, which substrate also has a ribbed structure 801. Top views of the instrument panel substrate 800 are shown in FIGS. 19A and 19B. The top of the instrument panel substrate has bolt holes 818 to accommodate 10 bolts or screws, however, some airbag assemblies may be designed to use fewer bolts, such as 4-8. A side view of the instrument panel substrate 800 is shown in FIG. 21A, and FIG. 21 shows a corresponding bottom view.

A top view of the bolt 802 with relevant pieces is shown in FIG. 20A, with a side view shown in FIG. 20B. The bolt may have a total height in a range of 1.0-3.5 in, preferably 1.3-2.0 in, more preferably 1.5-1.8 in, or about 1.75 in. The head of the bolt may have a diameter of 0.2-1.5 in, 0.3-0.7 in, or about 0.5 in. In one embodiment, to prevent loosening, a bolt and/or nut may be adhered to each other or irreversibly fastened by a ratchet or some other structure.

Figure 22B:
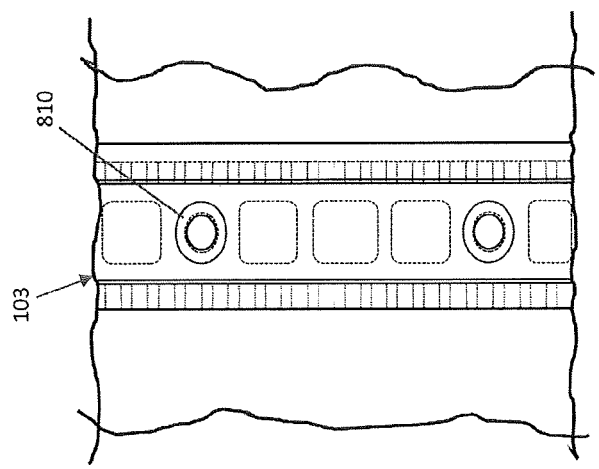
FIG. 22B shows a bottom view of FIG. 22A.
Figure 22A:
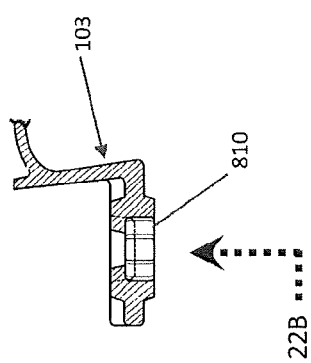
FIG. 22A is a side view of an airbag chute.
Figure 24:
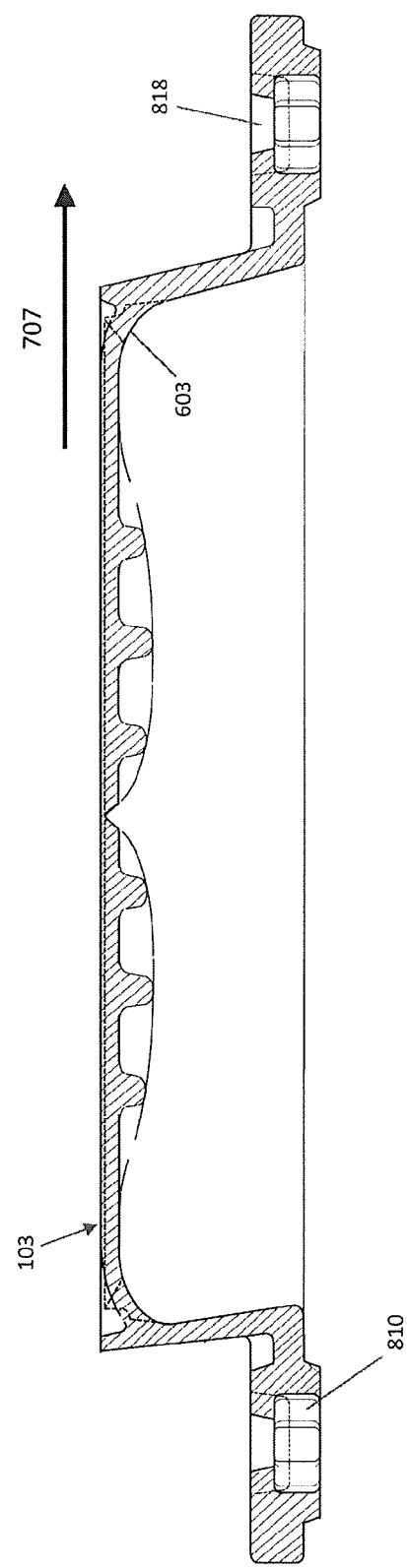
FIG. 24 shows a cross-section of an airbag chute with threaded inserts.

As shown in FIGS. 17, 18, and 24, the chute 103 has a substantially flat surface where it meets the instrument panel substrate 800. However, in some embodiments, the chute 103 may have a raised or depressed surface that complements with the instrument panel substrate 800. The chute 103 and instrument panel substrate 800 may be held in place by a threaded insert 810 or intermediary nut on the bolt 802. FIG. 22A shows a detailed view of the threaded insert within the chute 103, with FIG. 22B showing a corresponding bottom view of the chute 103.

Figure 23B:
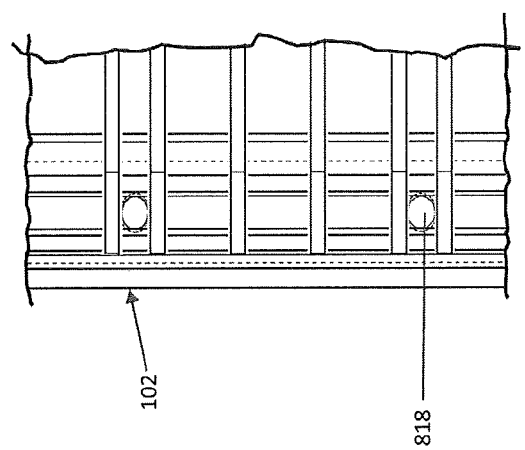
FIG. 23B shows a bottom view of FIG. 23A.
Figure 23A:
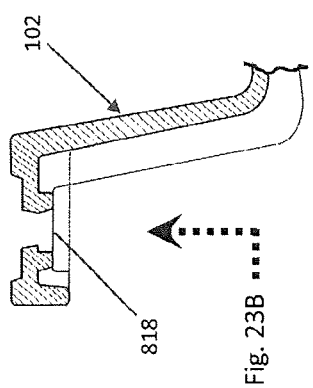
FIG. 23A is a side view of an airbag module housing.

The chute 103 additionally has a substantially flat surface where it contacts the module housing 102. However, the chute and module housing may have complementary fitting shapes; as shown in FIGS. 17 and 18, the chute 103 has a raised surface that fits into the depressed surface of the module housing 102, proximal to the bolt 802. In one embodiment, an airbag assembly having raised and depressed surfaces may allow for the parts to be secured or validated before fastening the flange nuts 814. FIG. 23A shows a side view of the module housing 102 bolt hole 818, with FIG. 23B showing a corresponding bottom view of the module housing 102. FIGS. 17 and 18 additionally show the pancake inflator 804 secured at the bottom of module housing with bolts 816 and nuts 814, preferably the pancake inflator 804 is secured with four bolts. The bottom views of FIGS. 21B, 22B, and 23B all show that the instrument panel substrate 800, chute 103 and module housing 102 may be shaped with gussets and ribs for structural support.

In one embodiment, the airbag assembly may comprise an additional peripheral reinforcement structure. For instance, one or more hoop tension rings 812 may be placed around the chute and/or module housing. FIG. 19B shows a general peripheral structure of one hoop tension ring 812 in relation to the opening of the instrument panel substrate 800. In some embodiments, the hoop tension ring 812 may also have bolt holes 818. As shown by the side views of the hoop tension ring 812 in FIGS. 17, 18, and 20A, the hoop tension ring 812 may have a substantially flat surface, and being held in place by the flange nut 814, may also act as a washer. Preferably the hoop tension ring is placed at the bottom of the airbag module housing, but in other embodiments, the hoop tension ring may be placed between the airbag module housing and the chute, or between the chute and the instrument panel substrate. Additionally, more than one hoop tension ring may be added, depending on its thickness and the total length of the bolt. Preferably the hoop tension ring comprises aluminum, however, other metals or non-metals may be used.

FIG. 24 is a side view of the airbag chute 103, similar to FIG. 17. The top of the airbag chute has a breakable door attached by living hinges 603.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. An airbag assembly, comprising:
an airbag chute configured to attach to an instrument panel, and
an airbag module housing attached to the airbag chute,
wherein the airbag chute and the airbag module housing each comprise at least 50 wt % thermoplastic olefin or thermoplastic elastomer, and
wherein the thermoplastic olefin or thermoplastic elastomer comprises an elastomer domain dispersed in a poly-olefinic polypropylene matrix.

2. The airbag assembly of claim 1, wherein the airbag chute and the airbag module housing each comprise 50 wt % or less of a glass filler.

3. The airbag assembly of claim 1, wherein the airbag chute and the airbag module housing are substantially free of a glass filler.

4. The airbag assembly of claim 1, wherein the airbag chute and the airbag module housing are each formed of the same material.

5. The airbag assembly according to claim 1, wherein the airbag module housing comprises sidewalk that have an average thickness in a range of 1.0-mm.

6. The airbag assembly according to claim 1, further comprising an instrument panel.

7. The airbag assembly of claim 6, wherein the instrument panel comprises a second thermoplastic olefin or thermoplastic elastomer.

8. The airbag assembly of claim 6, wherein the airbag chute is attached to the instrument panel by vibration welding, sonic welding, infrared welding, top-load type design, snap-fit type design, adhesive bonding, and/or mechanical fastening.

9. The airbag assembly according to claim 1, wherein the airbag chute comprises ribbings on one or more sidewalls.

10. The airbag assembly according to claim 1, wherein the airbag module housing and the airbag chute are both injection molded.

11. The airbag assembly according to claim 1, wherein the airbag chute and the airbag module housing are attached by bolts or screws.

12. The airbag assembly according to claim 11, wherein the airbag chute attaches to the bolts or screws by a threaded insert.

13. The airbag assembly according to claim 1, further comprising a hoop tension ring placed around the airbag chute and/or the airbag module housing.

14. The airbag assembly according to claim 1, further comprising an instrument panel substrate attached between the instrument panel and the airbag chute.

15. The airbag assembly of claim 14, wherein the instrument panel substrate comprises glass-polypropylene, polypropylene, glass-nylon, talc, glass filler, and/or thermoplastic polyolefin.

16. The airbag assembly according to claim 1, wherein the airbag chute comprises sidewalls and each sidewall forms a plurality of windows and wherein the airbag module housing comprises at least two sidewalls with projections corresponding to each window in the airbag chute.

17. The airbag assembly of claim 16, wherein when the projections project into the windows, the airbag chute sidewalls and the at least two sidewalls of the airbag module housing form a double wall.

18. The airbag assembly of claim 17, wherein an internal pressure created by an airbag deployment maintains an engagement of the projections and windows throughout the airbag deployment.

19. The airbag assembly of claim 17, wherein the airbag module housing is completely inserted into the airbag chute.

20. The airbag assembly according to claim 1,
wherein the thermoplastic olefin or thermoplastic elastomer comprises the following components (A) and (B) and contains from 10 to 300 parts by weight of the component (B) per 100 parts by weight of the component (A) and in which the melt flow rate at a measurement temperature of 230° C. and a measurement load of 21.18 N is from 0.5 to 50 g/10 min,
wherein Component (A) is a polypropylene-based resin, and
wherein Component (B) is an olefin-based block copolymer containing a polymer block composed of ethylene and an ethylene α-olefin copolymer block.

21. The airbag assembly of claim 20, wherein component (B) is an olefin-based block copolymer having a crystal melting peak at 110 to 125° C. and the crystal melting heat quantity at the peak is 20 to 60 J/g.

22. An airbag module housing, comprising:
at least 50 wt % thermoplastic olefin or thermoplastic elastomer relative to a total weight of the airbag module housing,
wherein the thermoplastic olefin or thermoplastic elastomer comprises an elastomer domain dispersed in a poly-olefinic polypropylene matrix.

23. The airbag module housing of claim 22, which comprises 50 wt % or less of a glass filler.

24. The airbag module housing of claim 22, which is substantially free of a glass filler.

25. The airbag module housing according to claim 22, further comprising sidewalls that have an average thickness in a range of 1.0-3.5 mm.

26. The airbag module housing according to claim 22, further comprising a plurality of projections configured to interlock the airbag module housing to a chute.

27. The airbag module housing according to claim 22, wherein the airbag module housing comprises at least 80 wt % thermoplastic olefin or thermoplastic elastomer.

28. The airbag module housing according to claim 22, wherein the airbag module housing comprises at least two sidewalls with projections corresponding to windows in an airbag chute.

29. The airbag module housing according to claim 22, wherein the thermoplastic olefin or thermoplastic elastomer comprises the following components (A) and (B) and contains from 10 to 300 parts by weight of the component (B) per 100 parts by weight of the component (A) and in which the melt flow rate at a measurement temperature of 230° C. and a measurement load of 21.18 N is from 0.5 to 50 g/10 min,
wherein Component (A) is a polypropylene-based resin, and
wherein Component (B) is an olefin-based block copolymer containing a polymer block composed of ethylene and an ethylene α-olefin copolymer block.

30. An airbag chute, comprising:
at least 50 wt % thermoplastic olefin or thermoplastic elastomer,
wherein the thermoplastic olefin or thermoplastic elastomer comprises an elastomer domain dispersed in a poly-olefinic polypropylene matrix,
wherein the airbag chute comprises sidewalls and each sidewall forms a plurality of windows configured to interlock the airbag chute with an airbag module housing, and
wherein each sidewall has an exterior face, and at least two sidewalls have ribbings.

31. The airbag chute of claim 30, further comprising 50 wt % or less of a glass filler.

32. The airbag chute of claim 30, which is substantially free of a glass filler.

33. The airbag chute of claim 30, further comprising a hoop tension ring.

34. The airbag chute of claim 30, wherein the thermoplastic olefin or thermoplastic elastomer comprises the following components (A) and (B) and contains from 10 to 300 parts by weight of the component (B) per 100 parts by weight of the component (A) and in which the melt flow rate at a measurement temperature of 230° C. and a measurement load of 21.18 N is from 0.5 to 50 g/10 min,
wherein Component (A) is a polypropylene-based resin, and
wherein Component (B) is an olefin-based block copolymer containing a polymer block composed of ethylene and an ethylene α-olefin copolymer block.

35. The airbag chute of claim 34, wherein component (B) is an olefin-based block copolymer having a crystal melting peak at 110 to 125° C. and the crystal melting heat quantity at the peak is 2.0 to 60 J/g.

36. The airbag chute of claim 34, wherein the carbon number of the α-olefin in the ethylene α-olefin copolymer block of component (B) is 4 to 8.

37. The airbag chute of claim 34, wherein component (B) is an olefin-based block copolymer containing a polymer block composed of ethylene and an ethylene-1-octene copolymer block.

38. The airbag chute of claim 34, wherein component (A) is a polypropylene block copolymer obtained by polymerizing a propylene homopolymer in a first step and subsequently polymerizing a propylene-ethylene copolymer in a second step.

39. The airbag chute of claim 34, wherein the airbag chute comprises at least 80 wt % thermoplastic olefin or thermoplastic elastomer.

40. The airbag module housing according to claim 29, wherein component (B) is an olefin-based block copolymer having a crystal melting peak at 110 to 125° C. and the crystal melting heat quantity at the peak is 20 to 60 J/g.

41. The airbag module housing according to claim 29, wherein the carbon number of the α-olefin in the ethylene α-olefin copolymer block of component (B) is 4 to 8.

42. The airbag module housing according to claim 29, wherein component (B) is an olefin-based block copolymer containing a polymer block composed of ethylene and an ethylene-1-octene copolymer block.

43. The airbag module housing according to claim 29, wherein component (A) is a polypropylene block copolymer obtained by polymerizing a propylene homopolymer in a first step and subsequently polymerizing a propylene-ethylene copolymer in a second step.

44. An airbag assembly, comprising:
an airbag chute configured to attach to an instrument panel, and
an airbag module housing attached to the airbag chute,
wherein the airbag chute comprises ribbings on one or more sidewalls, and
wherein the airbag chute and the airbag module housing each comprise at least 50 wt % thermoplastic olefin or thermoplastic elastomer.

45. The airbag assembly of claim 44, wherein the airbag chute and the airbag module housing each comprise 50 wt % or less of a glass filler.

46. The airbag assembly of claim 44, wherein the airbag chute and the airbag module housing are substantially free of a glass filler.

47. The airbag assembly of claim 44, wherein the airbag chute and the airbag module housing are each formed of the same material.

48. The airbag assembly according to claim 44, wherein the airbag module housing and the airbag chute are both injection molded.

49. The airbag assembly according to claim 44, wherein the airbag chute comprises sidewalls and each sidewall forms a plurality of windows and wherein the airbag module homing comprises at least two sidewalls with projections corresponding to each window in the airbag chute.

50. The airbag assembly according to claim 1, wherein the airbag module housing and the airbag chute are both injection molded in a family tool.

51. The airbag assembly according to claim 44, wherein the airbag module housing and the airbag chute are both injection molded in a single family tool.

* * * * *